United States Patent
Woodman, Jr.

(10) Patent No.: US 6,349,122 B1
(45) Date of Patent: Feb. 19, 2002

(54) APPARATUS AND METHOD FOR DATA SYNCHRONIZING AND TRACKING

(75) Inventor: Gilbert R. Woodman, Jr., San Jose, CA (US)

(73) Assignee: Zilog, Inc., Campbell, CA (US)

( * ) Notice: Subject to any disclaimer, the term of this patent is extended or adjusted under 35 U.S.C. 154(b) by 0 days.

(21) Appl. No.: 09/469,935

(22) Filed: Dec. 21, 1999

Related U.S. Application Data

(62) Division of application No. 08/771,440, filed on Dec. 20, 1996, now Pat. No. 6,064,707.
(60) Provisional application No. 60/009,066, filed on Dec. 22, 1995, and provisional application No. 60/009,068, filed on Dec. 22, 1995.

(51) Int. Cl.[7] ............... H03L 7/00; H04L 7/00
(52) U.S. Cl. ............. 375/373; 327/152; 327/153; 327/161
(58) Field of Search ............. 375/371, 373, 375/360; 327/141, 144, 152, 153, 161, 162, 163

(56) References Cited

U.S. PATENT DOCUMENTS

| | | |
|---|---|---|
| 2,961,535 A | 11/1960 | Lanning |
| 4,290,022 A | 9/1981 | Puckette |
| 4,316,148 A | 2/1982 | Kaminski |
| 4,386,323 A | 5/1983 | Jansen |
| 4,412,342 A | 10/1983 | Khan et al. |
| 4,419,739 A | 12/1983 | Blum |
| 4,479,216 A | 10/1984 | Krambeck et al. |
| 4,514,647 A | 4/1985 | Shoji |
| 4,524,448 A | 6/1985 | Hüllwegen |
| 4,546,269 A | 10/1985 | Johnson |
| 4,847,876 A | 7/1989 | Baumbach et al. |
| 4,849,998 A | 7/1989 | Poklemba |
| 5,022,057 A | 6/1991 | Nishi et al. |
| 5,034,967 A | 7/1991 | Cox et al. |
| 5,457,719 A | 10/1995 | Guo et al. |
| 5,671,258 A | 9/1997 | Burns et al. |
| 5,761,254 A | 6/1998 | Behrin |
| 5,886,552 A * | 3/1999 | Chai et al. .......... 327/165 |
| 6,044,122 A * | 3/2000 | Ellersick et al. ....... 375/360 |

OTHER PUBLICATIONS

Homan, "Electronically Adjustable Computer Clocking System," IBM Technical Disclosure Bulletin, vol. 15, No. 1, pp. 252–254 (Jun. 1972).

Koetzle, "Computer Clock Distribution System with Programmable Delay and Automatic Adjustment," IBM Technical Disclosure Bulletin, vol. 18, No. 6, pp. 1912–1913 (Nov. 1975).

Hayes and Orr, "Synchronization of LSSD System Clocks to Asynchronous Signals," IBM Technical Disclosure Bulletin, vol. 27, No. 8, pp. 4934–4937 (Jan. 1985).

* cited by examiner

Primary Examiner—Amanda T. Le
(74) Attorney, Agent, or Firm—Skjerven Morrill MacPherson LLP

(57) ABSTRACT

An apparatus and method for synchronizing and tracking an input data stream and for generating a synchronous clock therefrom, comprising means for generating a plurality of clock signals oscillating at substantially the same frequency, but with different phases; a plurality of delay lines having a common data input for receiving said input data stream, each delay line having multiple delay elements connected in series and having a common clock input for receiving one of said clock signals for clocking data of said data stream along said delay line in a direction away from said common data input; means for detecting which of said plurality of delay lines said data from said data stream is propagating therein; and means for generating the synchronous clock based on one of said clock signals that clocks the delay line that data from said data stream is propagating therein.

3 Claims, 13 Drawing Sheets

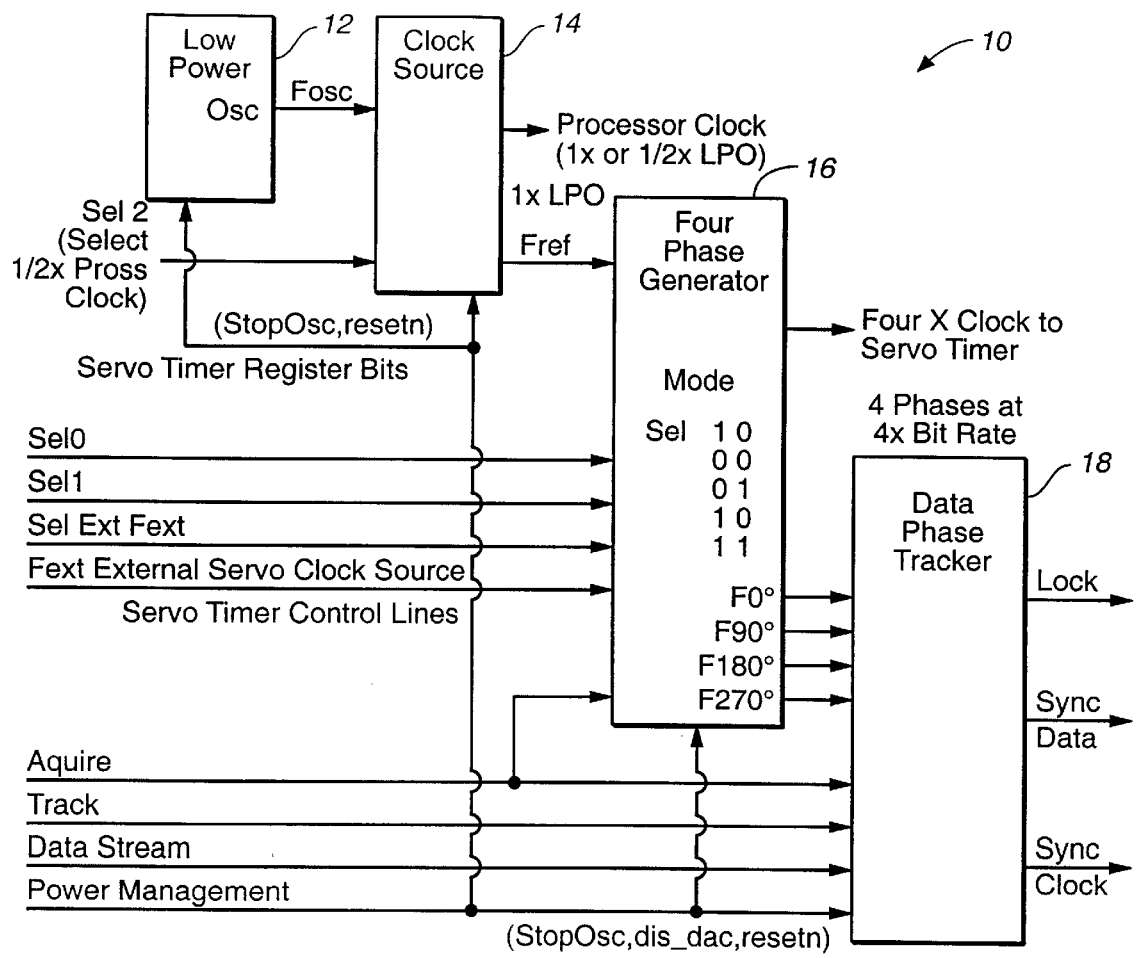
*FIG._1*
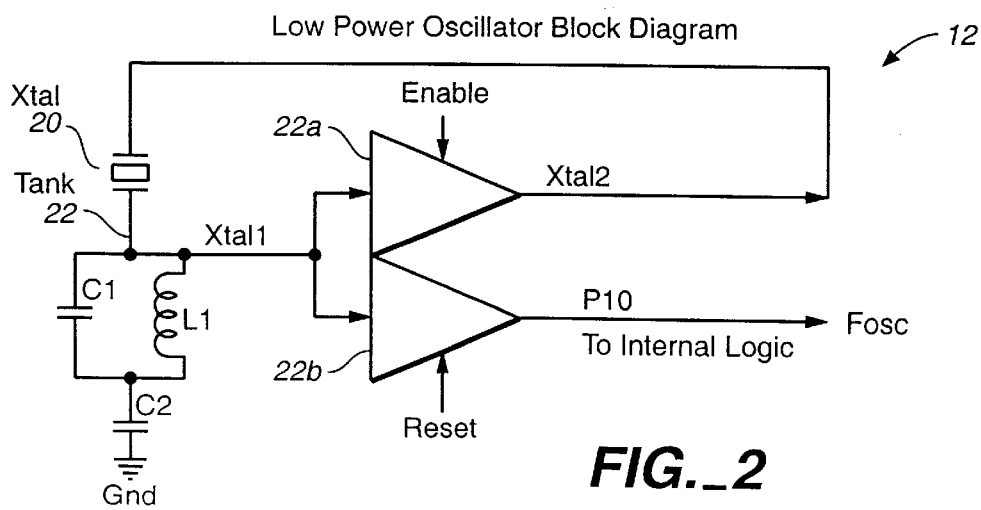
*FIG._2*

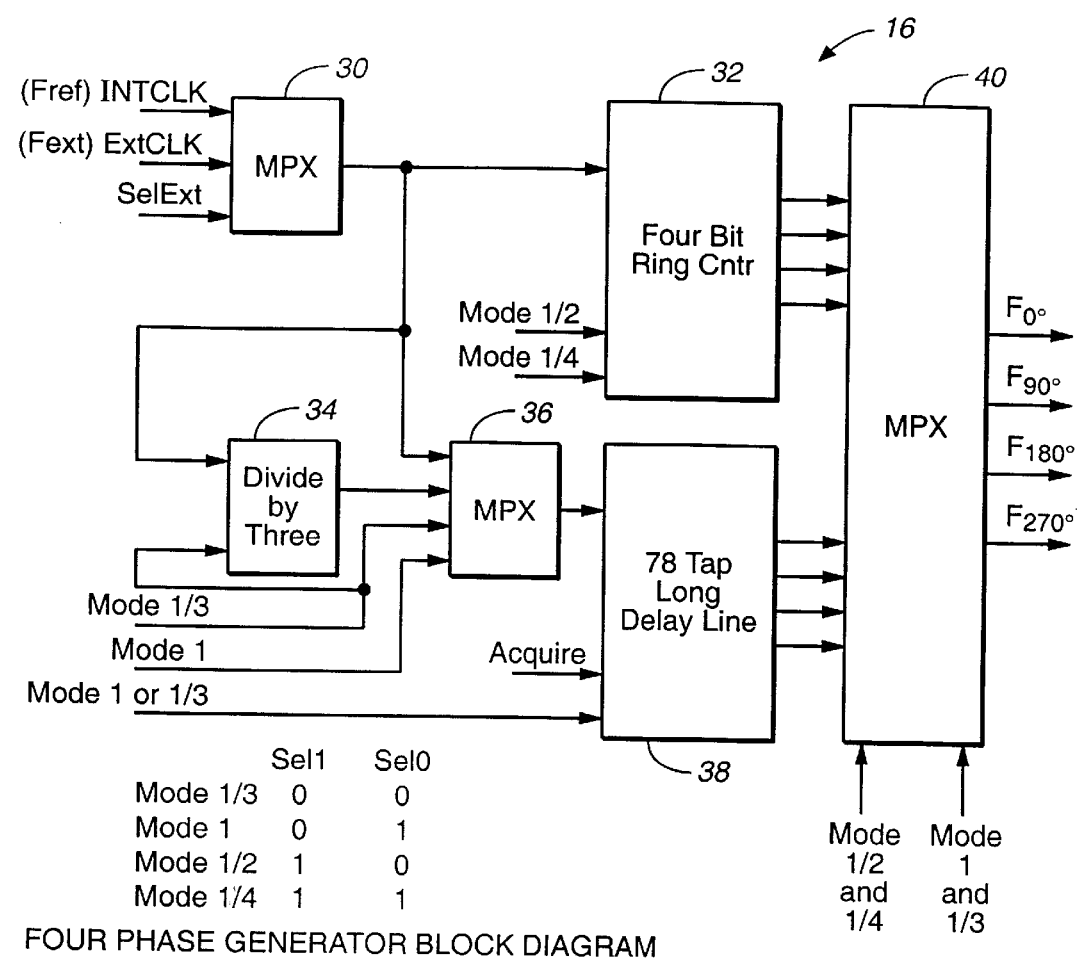
FIG._3A
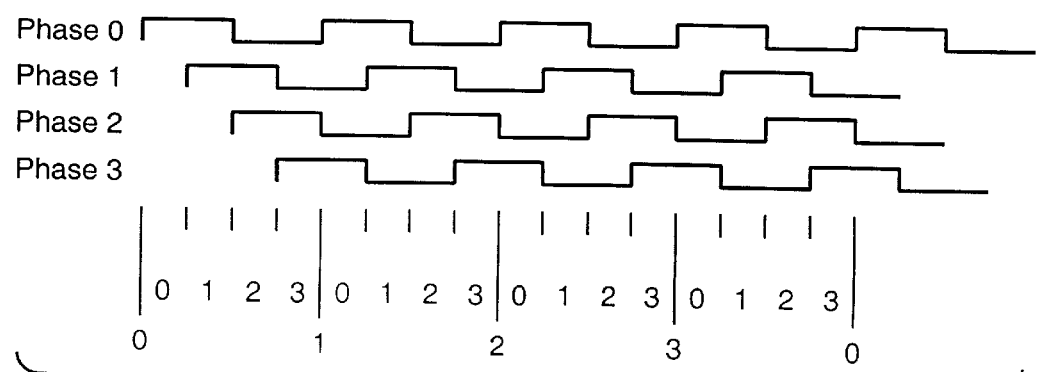
FIG._3B

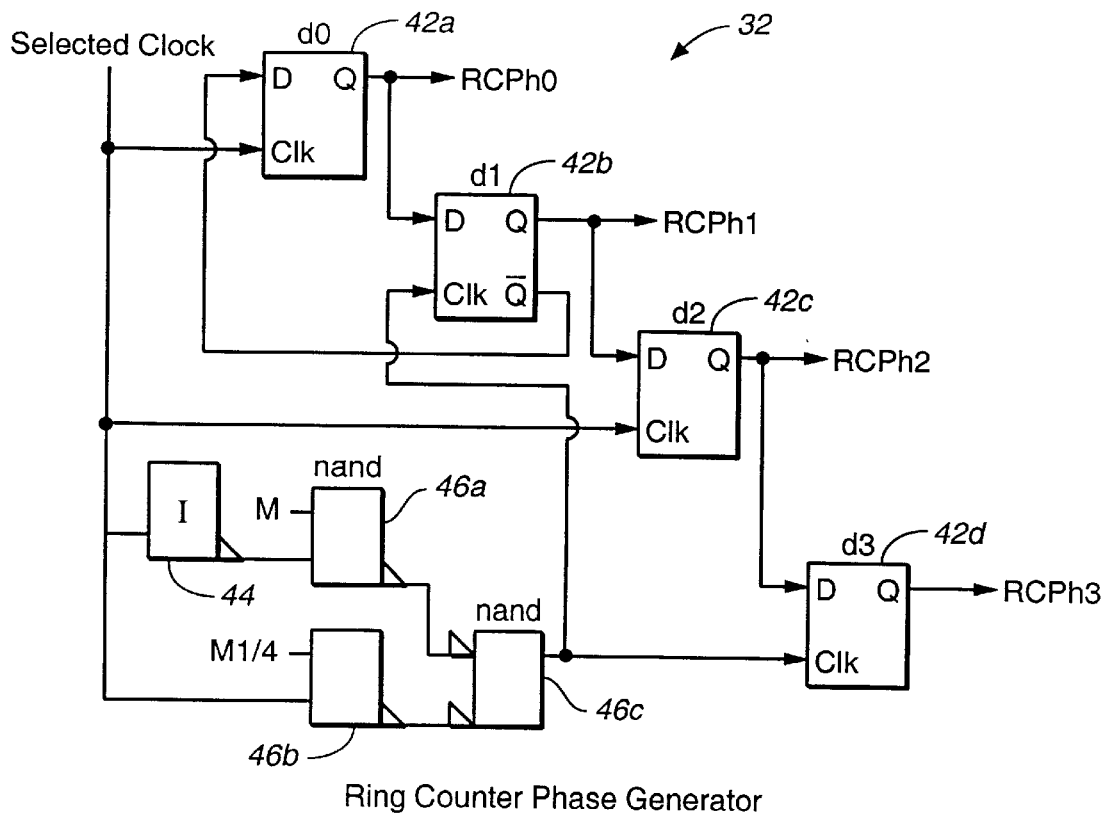
Ring Counter Phase Generator
FIG._4A
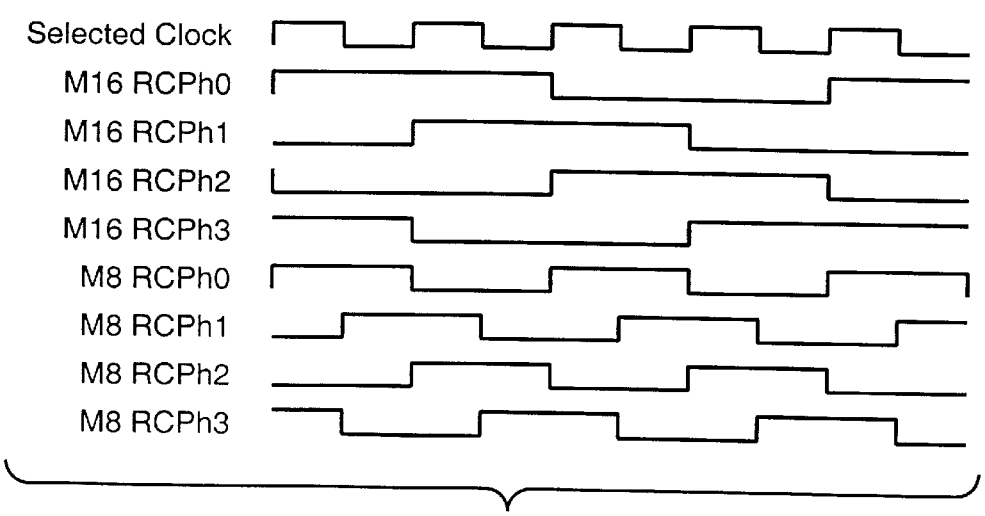
FIG._4B

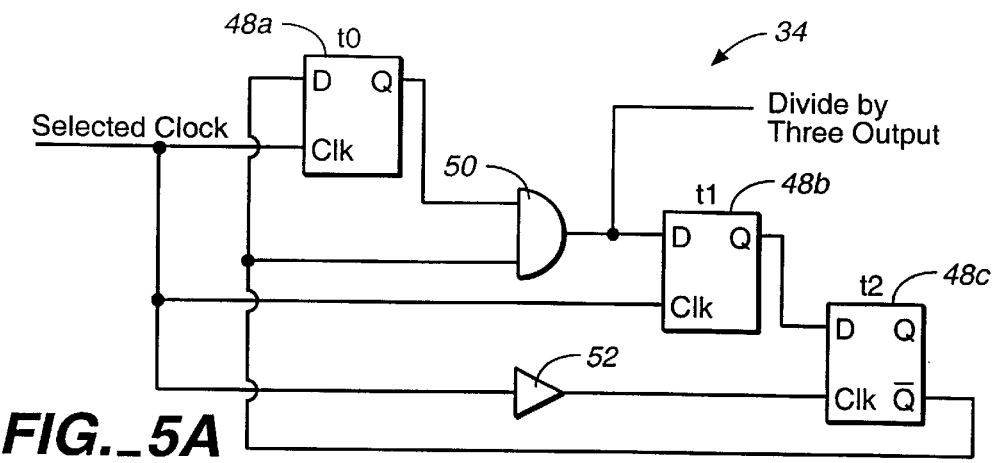
FIG._5A
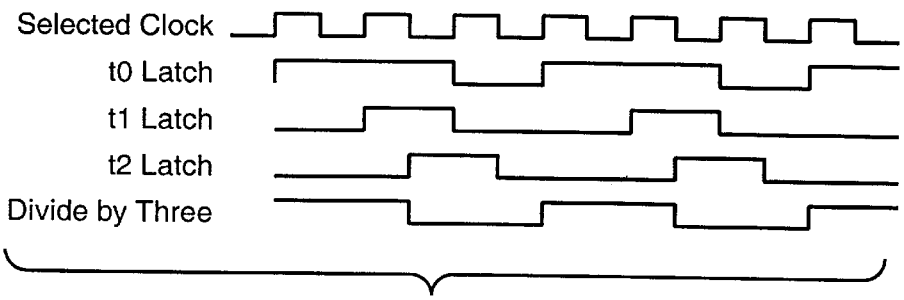
FIG._5B
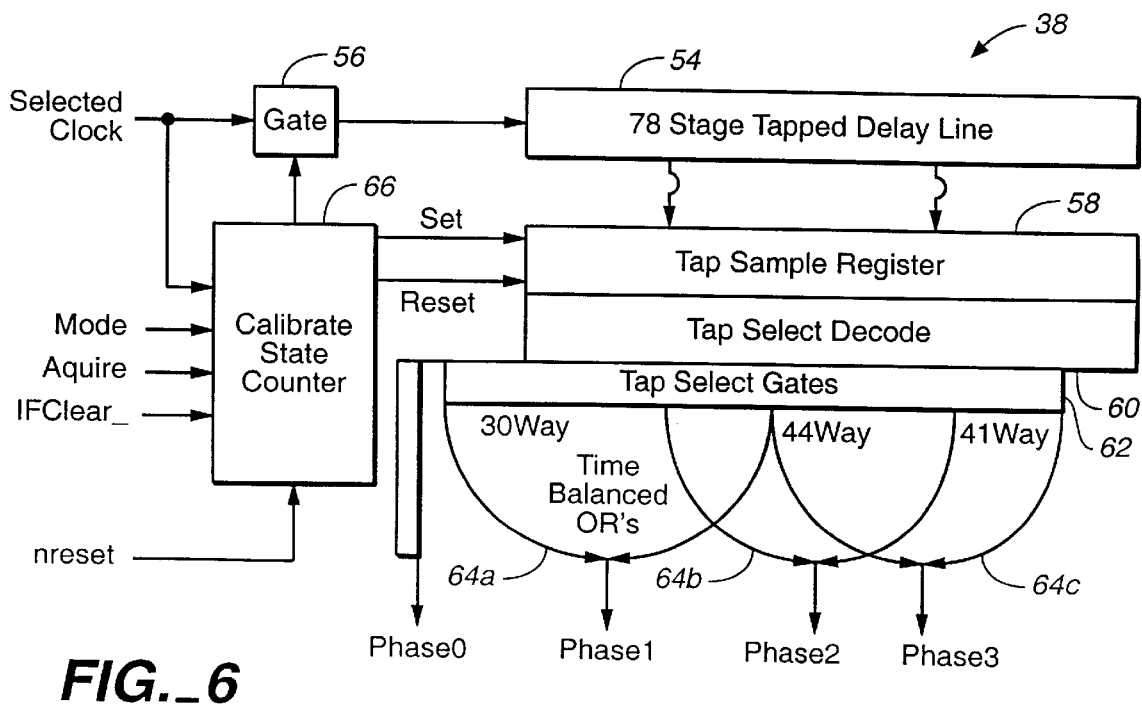
FIG._6

Table 1 : Tap Selection Pattern

| 1/4 Tap | 1/2 Tap | 3/4 Tap | Selected Latch |
|---|---|---|---|
| 2 | 5 | 7 | 10 |
| 3 | 6 | 9 | 12 |
| 3 | 7 | 10 | 14 |
| 4 | 8 | 12 | 16 |
| 4 | 9 | 13 | 18 |
| 5 | 10 | 15 | 20 |
| 5 | 11 | 16 | 22 |
| 6 | 12 | 18 | 24 |
| 6 | 13 | 19 | 26 |
| 7 | 14 | 21 | 28 |
| 7 | 15 | 23 | 30 |
| 8 | 16 | 24 | 32 |
| 8 | 17 | 25 | 33 |
| 9 | 18 | 27 | 34 |
| 9 | 19 | 28 | 35 |
| 10 | 20 | 30 | 36 |
| 10 | 21 | 31 | 37 |
| 11 | 22 | 32 | 38 |
| 11 | 23 | 33 | 39 |
| 12 | 24 | 34 | 40 |
| 12 | 25 | 34 | 41 |
| 13 | 26 | 35 | 42 |
| 13 | 27 | 36 | 43 |
| 14 | 28 | 37 | 44 |
| 14 | 29 | 38 | 45 |
| 15 | 30 | 39 | 46 |
| 15 | 31 | 39 | 47 |
| 16 | 32 | 40 | 48 |
| 17 | 33 | 41 | 50 |
| 18 | 34 | 42 | 52 |
| 19 | 35 | 44 | 54 |
| 20 | 36 | 46 | 56 |
| 21 | 37 | 47 | 58 |
| 22 | 38 | 49 | 60 |
| 23 | 39 | 50 | 62 |
| 24 | 40 | 52 | 64 |
| 25 | 41 | 53 | 66 |
| 26 | 42 | 55 | 68 |
| 27 | 43 | 56 | 70 |
| 28 | 44 | 58 | 72 |
| 29 | 45 | 59 | 74 |
| 30 | 46 | 61 | 76 |
| 31 | 47 | 62 | 78 |

FIG._7

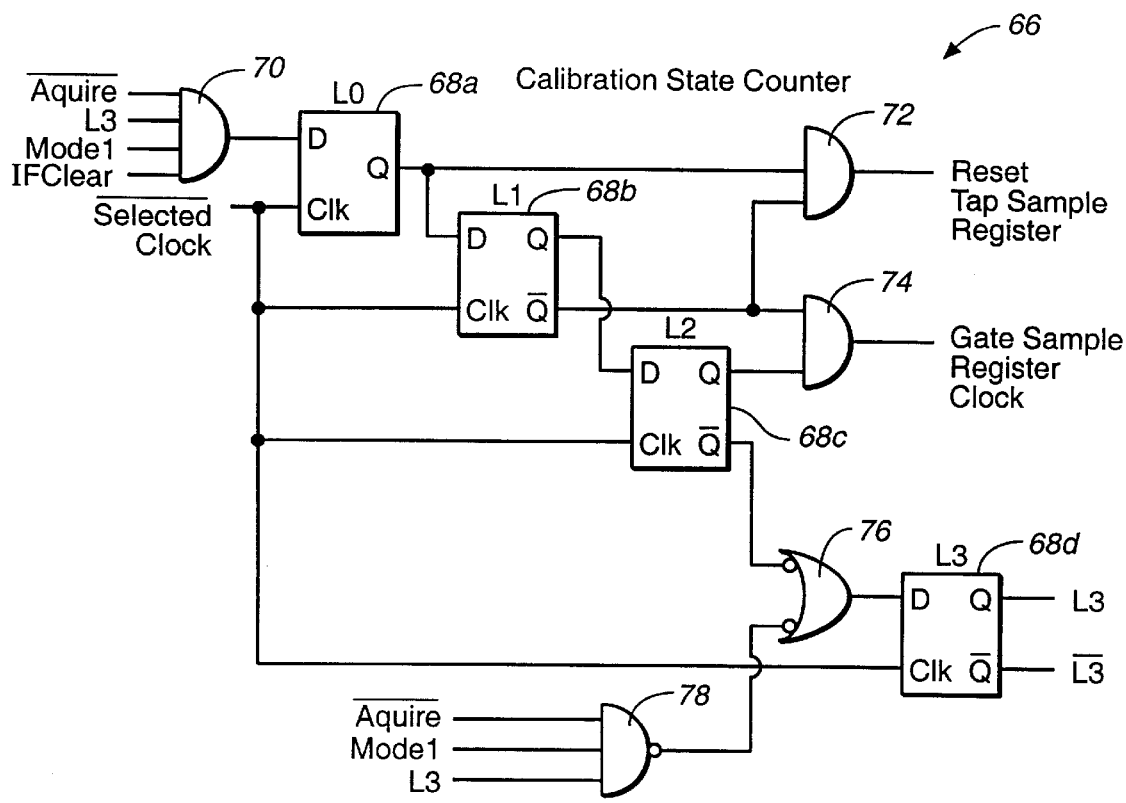
*FIG._8A*
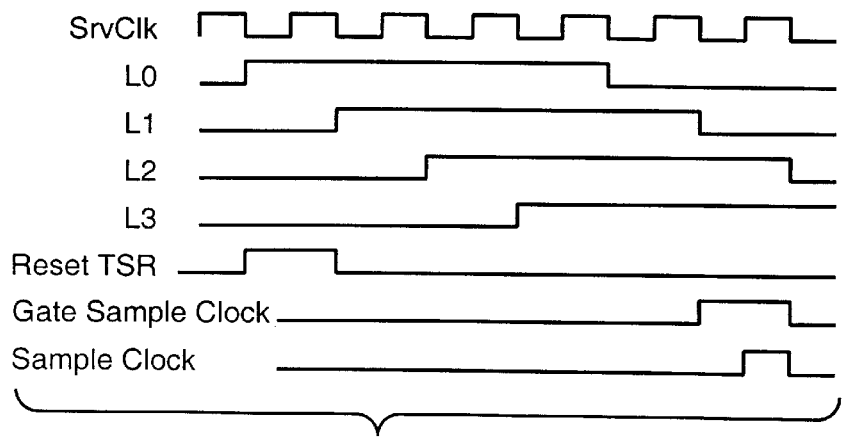
*FIG._8B*

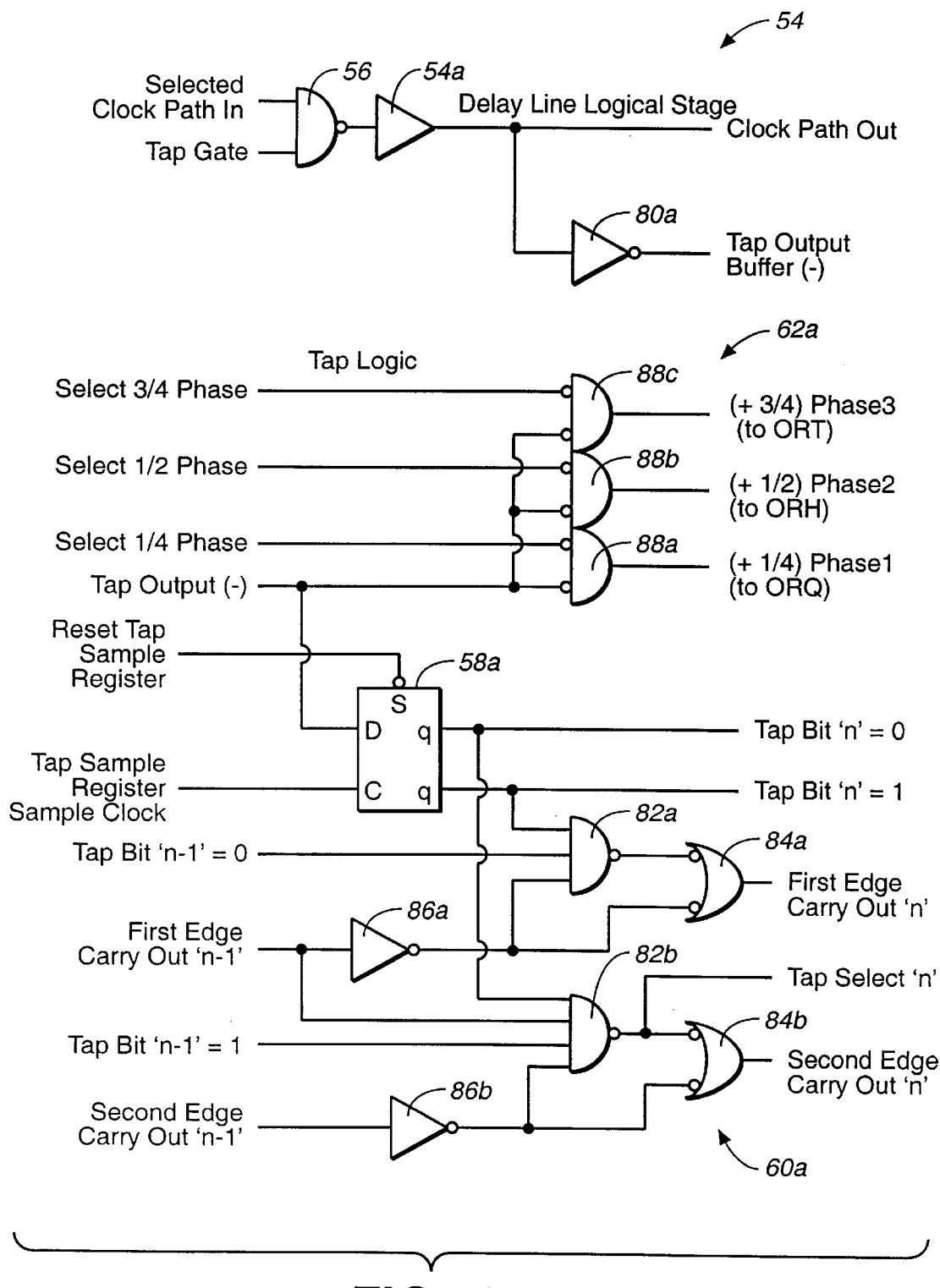
FIG._9

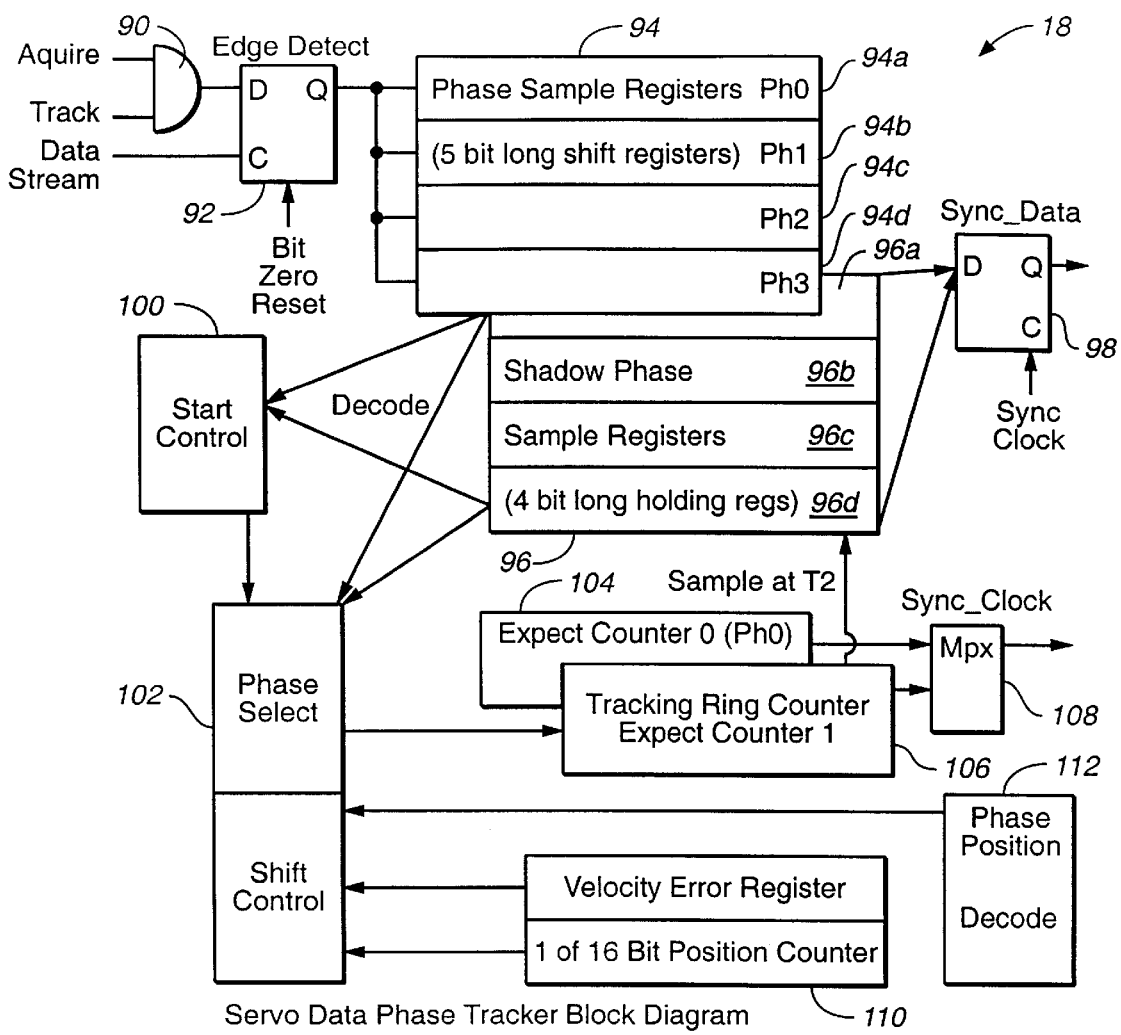
Servo Data Phase Tracker Block Diagram
FIG._10A
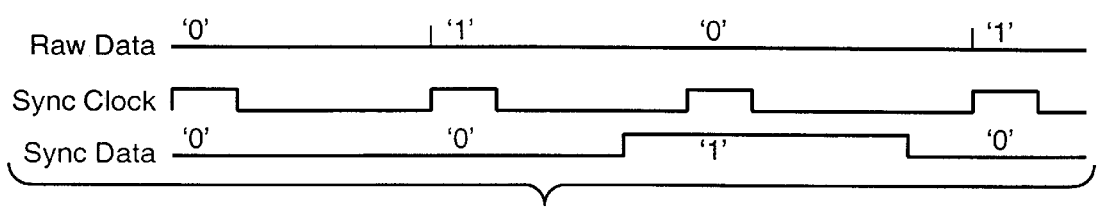
FIG._10B
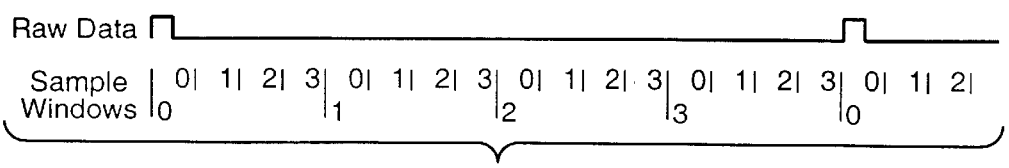
FIG._10C

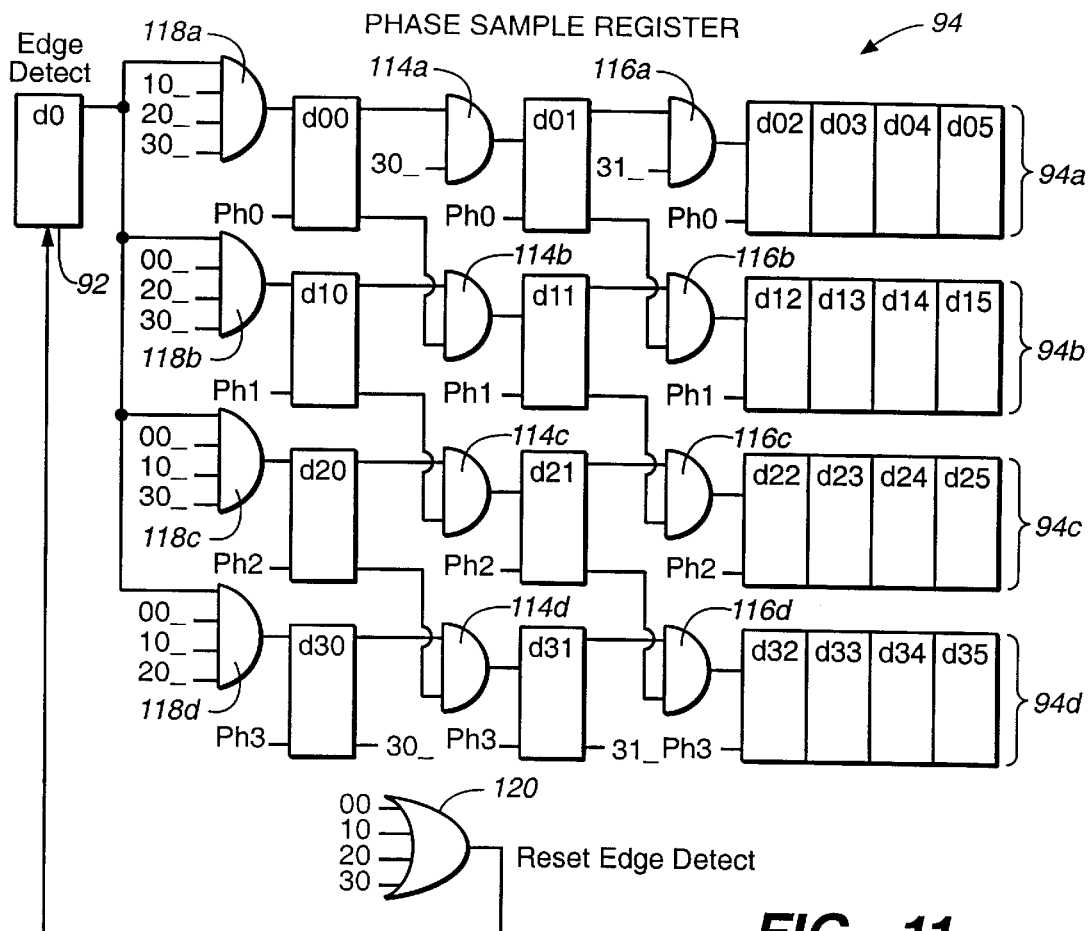
FIG._11
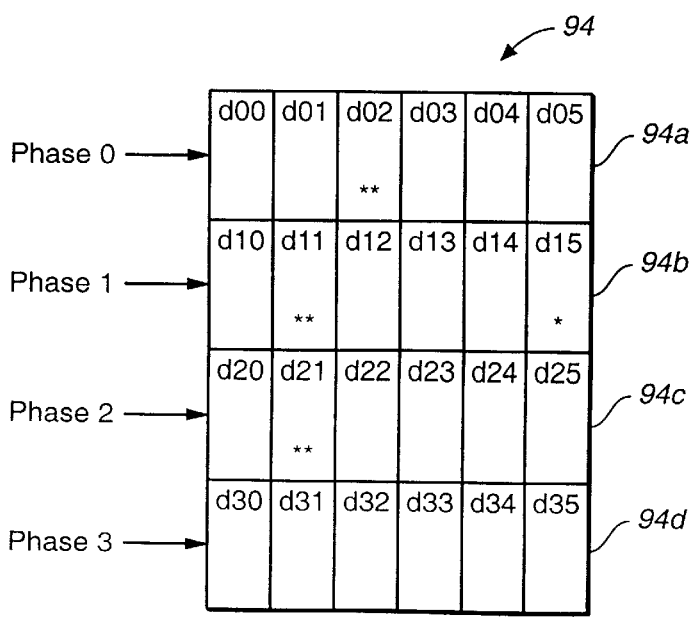
FIG._13

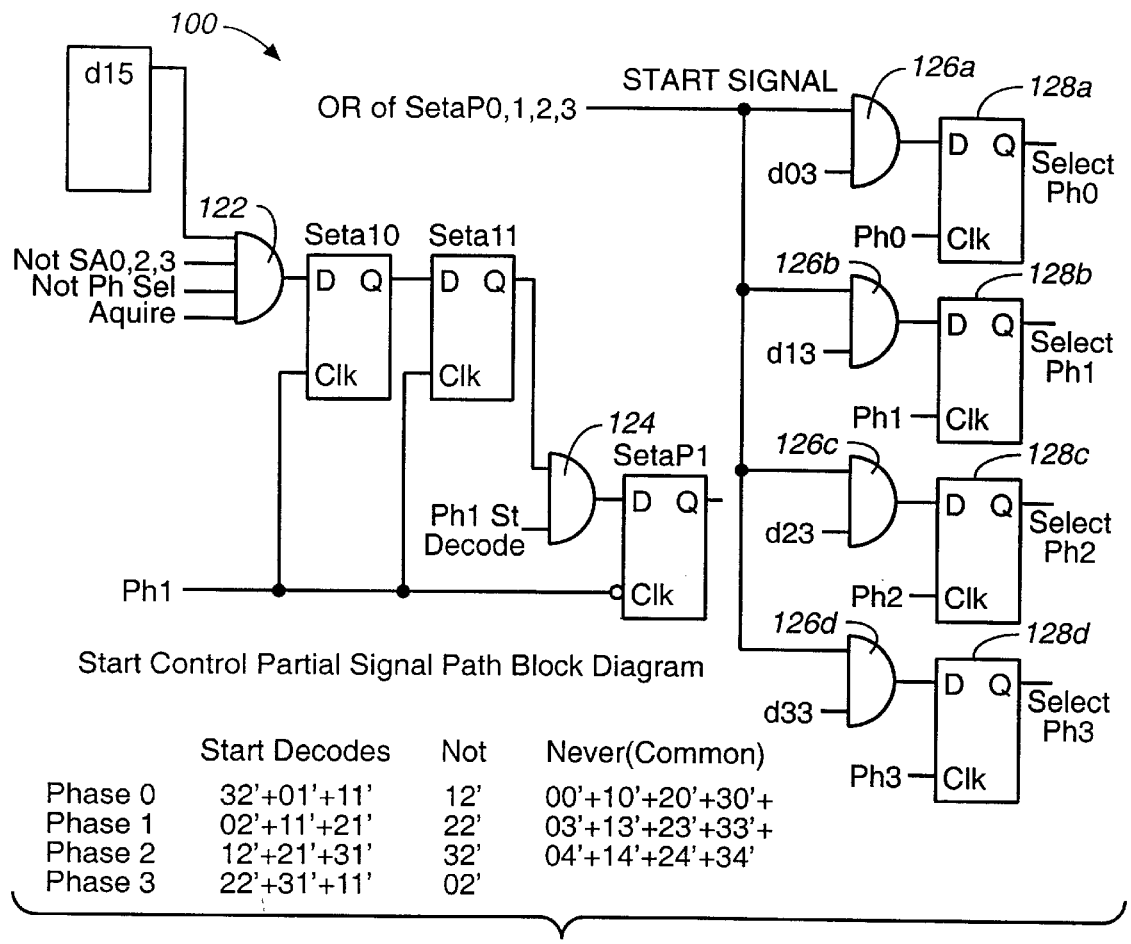
FIG._12A
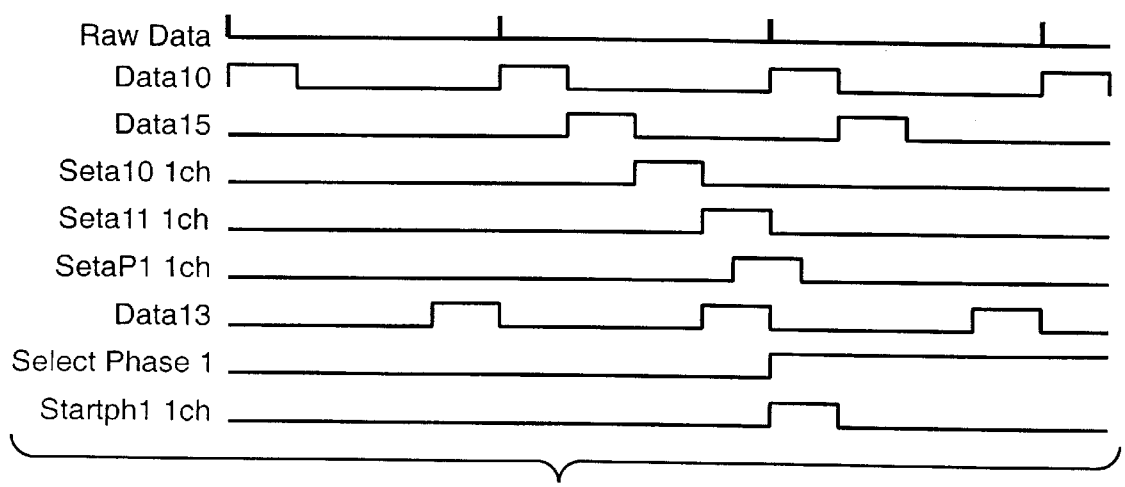
FIG._12B

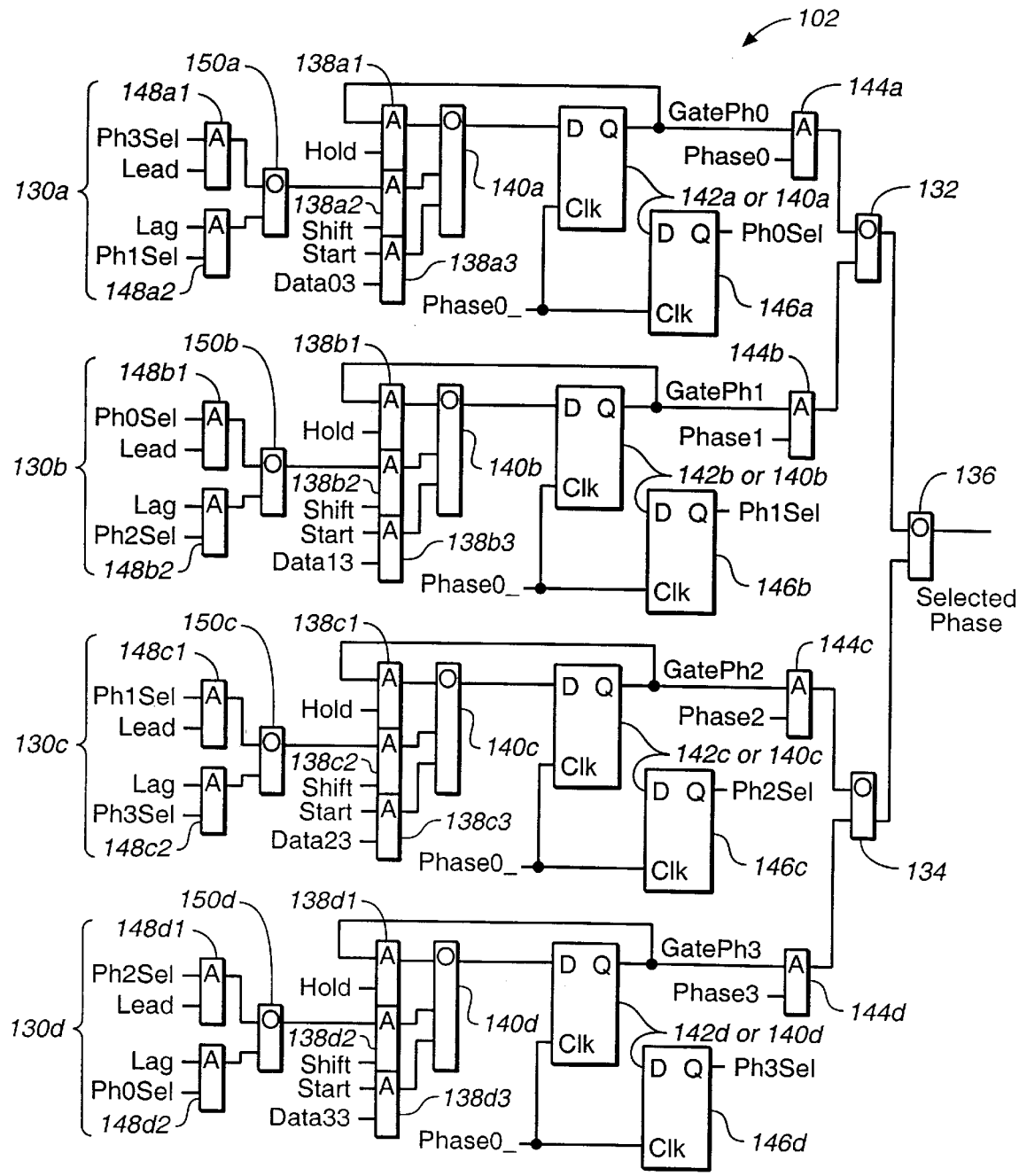
PHASE SELECT BARREL SHIFTER
*FIG._14A*

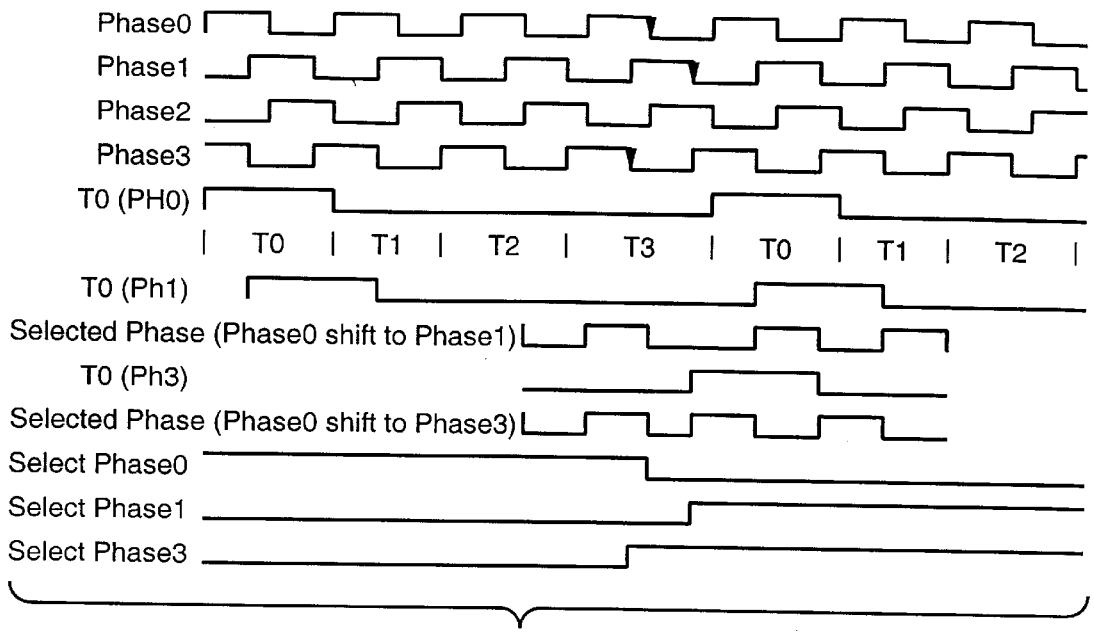
FIG._14B
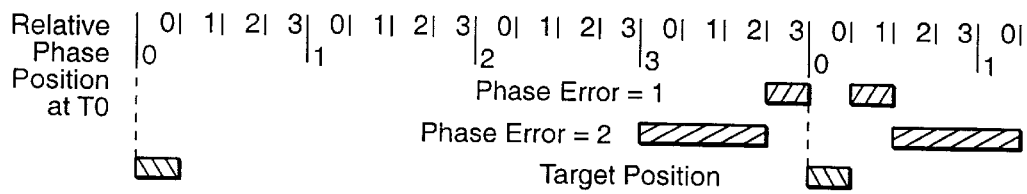
T2 Phase Position Sample Decodes:
| | Target | Lag = 1 | Lag = 2 | Lead = 1 | Lead = 2 | Track Error |
|---|---|---|---|---|---|---|
| Phase0 | d01' | d32' | d22'+d12'+d02' | d11' | d21'+d31'+d00' | d10'+d20'+d30' |
| Phase1 | d11' | d02' | d32'+d22'+d12' | d21' | d31'+d01'+d10' | d00'+d20'+d30' |
| Phase2 | d21' | d12' | d02'+d32'+d22' | d31' | d01'+d11'+d20' | d00'+d10'+d30' |
| Phase3 | d31' | d22' | d12'+d02'+d32' | d01' | d10'+d21'+d30' | d00'+d10'+d20' |
| Always | | | | | | d03'+d13'+d23'+d33' <br> d04'+d14'+d24'+d34' |
FIG._15

Velocity Error Register Step Decode Pattern
| Magnitude | | | | | Position | | | | | | | | | | | | | | | | |
|---|---|---|---|---|---|---|---|---|---|---|---|---|---|---|---|---|---|---|---|---|---|
| 16 | 8 | 4 | 2 | 1 | 0 | 1 | 2 | 3 | 4 | 5 | 6 | 7 | 8 | 9 | 10 | 11 | 12 | 13 | 14 | 15 | 0 |
| 0 | 0 | 0 | 0 | 1 | | | | | | | | | 1 | | | | | | | | |
| 0 | 0 | 0 | 1 | 0 | | | | | 1 | | | | | | | | 1 | | | | |
| 0 | 0 | 1 | 0 | 0 | | | 1 | | | | 1 | | | | 1 | | | | 1 | | |
| 0 | 1 | 0 | 0 | 0 | 0 | 1 | 0 | 1 | 0 | 1 | 0 | 1 | 0 | 1 | 0 | 1 | 0 | 1 | 0 | 1 | |
| 1 | 0 | 0 | 0 | 0 | 1 | 1 | 1 | 1 | 1 | 1 | 1 | 1 | 1 | 1 | 1 | 1 | 1 | 1 | 1 | 1 | |
FIG._16
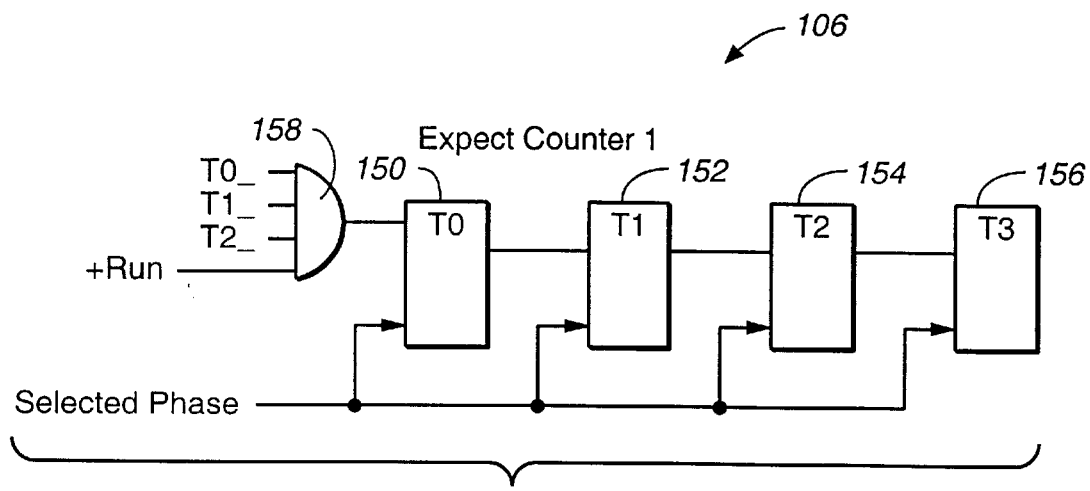
FIG._17A
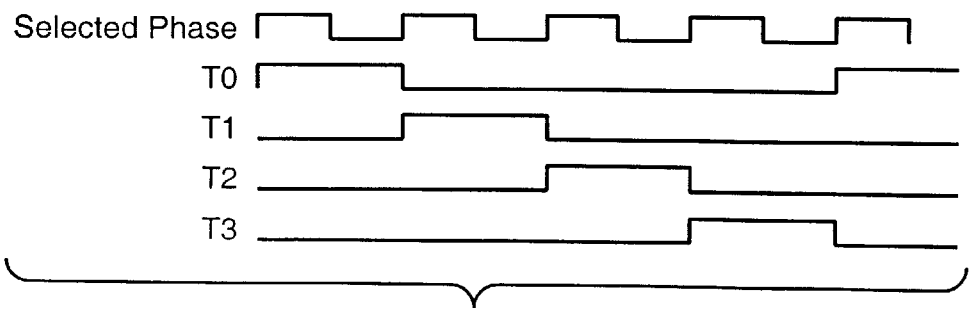
FIG._17B

APPARATUS AND METHOD FOR DATA SYNCHRONIZING AND TRACKING

CROSS-REFERENCE TO RELATED APPLICATIONS

This is a division of application Ser. No. 08/771,440, now U.S. Pat. No. 6,064,707 filed Dec. 20, 1996, which in turn claims priority from provisional patent applications Ser. No. 60/009,066 and Ser. No. 60/009,068, both of which were filed on Dec. 22, 1995, and are incorporated herein by reference.

BACKGROUND OF THE INVENTION

This invention relates generally to a method and apparatus for asynchronous data synchronizing and tracking, and more particularly, to a method and apparatus for asynchronous data synchronizing and tracking that utilizes a plurality of clocks oscillating at different phases to set up a plurality of sampling windows for receiving asynchronous data therein, and to develop an synchronous clock based on the particular sampling window in which the data was received.

There are many applications where there is a need to synchronize and track a stream of asynchronous data. For example, when data is transmitted from a servo device, such as a hard disk or a floppy disk, the transmitted data is generally asynchronous. Part of the reason for the asynchronous nature of the data stream at the output of a servo device is that the speed of the rotating disks varies, and accordingly, this variation will modulate the signal as the reading head picks up the data. Other reasons for the asynchronous nature of the servo device output data stream include variations due to noise, movement of the device, and electromagnetic interference.

Many devices require synchronous data for reading and processing such data as it is received. Such devices include memory devices, microprocessors, video devices and so forth. Specifically, these devices receive data by having the data clocked in. Thus, a clock in synchronous with the data is required. If the clock is at a constant frequency, then the data rate of the data stream should also follow the frequency of that clock. An asynchronous data stream would be virtually useless to these devices since these devices cannot tell at what particular time the data is available for receiving it. This is especially true if numerous consecutive zeros is being received, where a zero is represented as an absence of a pulse. Hence, there is a need to synchronize asynchronous data to a clock.

Furthermore, the servo device output data stream can also have a drift in the rate the data is being transmitted. In other words, on top of the random variation of the data rate of the servo device data stream due to rotational variations, movement and noise, the data rate may have a drift due to aging of the rotating motor or components of the servo device. This drift can also be a problem for devices that require incoming synchronous data for reading and processing. Thus, not only is there a need for synchronizing the asynchronous data stream and developing a synchronous clock therefrom, there is also a need for tracking any drift in the data stream for maintaining the data in synchronous with the clock.

A prior art technique for synchronizing and tracking asynchronous data stream is to use a phase lock loop system. A phase lock loop system generally comprises a feedback loop consisting of a phase detector, an integrator for filtering the output signal of the phase detector and an oscillator responsive to the phase detector filtered output signal for generating a clock having a phase-time relationship that varies as a function of said signal. The clock is fed back to the input of the phase detector and is compared to the asynchronous data stream applied to the other input of the phase detector. The comparison of the clock phase to the data stream phase by the phase detector produces an error signal at its output which is applied to the oscillator by way of the filter. The error signal causes the oscillator to produce a clock signal that tracks the phase of the incoming data stream.

A short coming of this technique is that for the phase lock loop system to work well, the frequency of the clock should be numerous times faster than the data rate of the incoming asynchronous data stream. Thus, there is a need to develop a technique for synchronizing and tracking asynchronous data stream that does not require generating a clock having a frequency numerous times the data rate of the asynchronous data stream.

A further short coming of the phase lock loop technique is that there is an associated capture time with the phase lock loop for synchronizing its clock to the input asynchronous data stream. The capture or locking time of a phase lock loop system is a function of the phase detector, integrator or filter and the responsive of the oscillator. In the usual case, during the time where the phase lock loop attempts to lock with the incoming asynchronous data stream, numerous clock cycles may have been generated. Usually, it is desirable to eliminate this delay in locking to the asynchronous data stream since a faster system would result.

OBJECTS OF THE INVENTION

It is an object of this invention to provide a method and apparatus for synchronizing and tracking a data stream and generating a synchronous clock therefrom.

It is another object of this invention to provide a method and apparatus for synchronizing and tracking a data stream and generating a synchronous clock therefrom, where the frequency of the sampling clock signals is relatively a small number of times faster than the data rate of the incoming data stream.

It is another object of this invention to provide a method and apparatus for synchronizing and tracking a data stream and generating a synchronous clock therefrom, where the capture time for locking to the incoming data stream is relatively small as compared to phase lock loop systems.

SUMMARY OF THE INVENTION

These and additional objects are accomplished by the various aspects of the present invention, wherein, briefly and generally an apparatus for synchronizing and tracking an input data stream and for generating a synchronous clock therefrom is provided, comprising means for generating a plurality of clock signals oscillating at substantially the same frequency, but with different phases; a plurality of delay lines having a common data input for receiving said input data stream, each delay line having multiple delay elements connected in series and having a common clock input for receiving one of said clock signals for clocking data of said data stream along said delay line in a direction away from said common data input; means for detecting which of said plurality of delay lines said data from said data stream is propagating therein; and means for generating the synchronous clock based on one of said clock signals that clocks the delay line that data from said data stream is propagating therein.

A method of synchronizing and tracking a data stream and generating a synchronous clock therefrom is also provided, comprising the steps of generating a plurality of clock signals oscillating at substantially the same frequency, but with different phases; applying each of said clock signals to a corresponding clock input of a plurality of delay lines, each delay line having a common data input for clocking data along said delay line in a direction away from said common data input; applying said data stream to said common data input of said plurality of delay lines; and generating a synchronous clock based on the clock signal that clocks in data into said corresponding delay line of said plurality of delay lines.

Also provided herein is an apparatus for generating a selected phase of a clock signal, comprising a delay line comprising a plurality of delay elements and having an input for receiving said clock signal; a memory device for sampling therein the data outputs of said delay elements; a device coupled to said memory device for selecting which delay element output produces the selected phase of the clock signal; and a gating device coupled to the outputs of said delay elements and to the selecting device for gating the output of the delay element that produces the selected phase of the base clock signal.

Additional objects, features and advantages of various aspects of the present invention will become apparent from the following description of its preferred embodiments, which description should be taken in conjunction with the accompanying drawings.

BRIEF DESCRIPTION OF THE DRAWINGS

FIG. 1 shows a block diagram of data synchronizer and tracker as embodied in the invention;

FIG. 2 shows a block diagram of a low power oscillator as embodied in the invention;

FIGS. 3A and 3B show a block diagram of a four phase generator as embodied in the invention and corresponding output timing diagram, respectively;

FIGS. 4A and 4B show a block diagram of a ring counter phase generator embodied in the four phase generator of the invention and corresponding output timing diagram, respectively;

FIGS. 5A and 5B show a block diagram of a divide-by-three counter embodied in the four phase generator of the invention, and corresponding timing diagram, respectively;

FIG. 6 shows a block diagram of a tapped delay line phase generator embodied in the four phase generator of the invention;

FIG. 7 depicts a table of the tap selection pattern of the tapped delay line phase generator embodied in the tapped delay phase generator of the invention;

FIGS. 8A and 8B show a block diagram of a calibration state counter embodied in the tapped delay phase generator of the invention, and corresponding timing diagram;

FIG. 9 shows a block diagram of a representative stage of a tap delay line, tap sample register, tap select decode, and tap select gates embodied in the tapped delay line phase generator of the invention;

FIGS. 10A, 10B, and 10C show a block diagram of a data phase tracker as embodied in the invention, corresponding input and output timing diagrams, a timing diagram of the relationship between the data stream and the sample windows of the data phase tracker of the invention;

FIG. 11 shows a block diagram of a phase sample register embodied in the data phase tracker of the invention;

FIGS. 12A and 12B show a block diagram of a start control unit embodied in the data phase tracker of the invention, and corresponding timing diagram;

FIG. 13 shows a block representation of the phase sample register embodied in the data phase tracker of the invention;

FIGS. 14A and 14B show a block diagram of a phase select barrel shifter embodied in the data phase tracker of the invention, and corresponding timing diagram;

FIG. 15 shows a table illustrating the phase position decodes of the data phase tracker of the invention;

FIG. 16 shows a table depicting the step decode pattern of the velocity error register embodied in the data phase tracker of the invention; and, FIGS. 17A and 17B show a block diagram of a tracking ring counter embodied in the data phase tracker of the invention, and corresponding timing diagram, respectively.

DETAILED DESCRIPTION OF THE PREFERRED EMBODIMENTS

Referring initially to FIG. 1, a block diagram of the data synchronizer and tracker 10 is shown. The purpose of the data synchronizer and tracker of the invention is to receive an asynchronous data stream, such as from a servo device, and synchronize the asynchronous data stream to an internally generated clock. The asynchronous data stream is generally periodic, having a data rate that varies as a function of the disk rotational velocity, and is subject to tolerances during rotation and head arm motion. In the preferred embodiment, a bit "1" of the asynchronous data stream is represented as an incoming pulse, whereas a bit "0" is represented as an absence of an incoming pulse. Accordingly, a "0" bit provides no timing information; however, synchronizing and tracking is still desirable during transmission of numerous consecutive "0" bits.

Usually, the asynchronous data stream from a servo device, such as a floppy or hard disk, are transmitted in groups of data known as servo fields. A servo field comprises an initial group of synchronous bits and then the actual data. In the preferred embodiment, the synchronous bits includes a preamble of series of "1" bits, followed by a Grey code and an A,B&C servo bursts. Also in the preferred embodiment, the output of the servo device includes an Acquire signal that indicates the beginning of a servo data field and is asserted throughout a data field transmission, and a Track signal that is also asserted during a servo field transmission except during the transmission of the A,B&C servo bursts in order to cause numerous "0" bits to be transmitted into the tracker; and thus, preventing a tracking failure to occur during the transmission of the A,B&C servo bursts.

The data synchronizer and tracker 10 comprises a low power oscillator 12 for generating a clock signal that preferably forms the basis for generating all other clock signals associated with the data synchronizer and tracker 10. The frequency of the clock signal generated by the oscillator 10 may be represented by $F_{osc}$. The output of the oscillator 12 is coupled to a clock source 14 which generates a reference clock signal from the clock signal of the oscillator. The clock source 14 has a frequency select input (SEL2) which allows for selection of the frequency of the reference clock signal $F_{ref}$ to be either equal to $F_{osc}$ (SEL2=0) or ½ $F_{osc}$ (SEL2=1).

The clock source 14 feeds the reference clock $F_{ref}$ to a four phase generator 16. The four phase generator 16 generates from the reference clock signal $F_{ref}$, four clock signals which are preferably time-balanced signals and which differ in phase by 90 degrees. These time balanced signals can be represented as $F_{0°}$ (PH0), $F_{90°}$ (Ph1), $F_{180°}$ (Ph2) and $F_{270°}$ (Ph3), with the subscript representing the relative phase difference from the $F_{0°}$ time-balanced signal. Although the preferred phases of these clock signals are 0, 90, 180 and 270 degrees, it shall be understood that other phases can be used and they need not be time-balanced. Furthermore, it shall be further understood that four signals is not necessary, it could be less or more. If more, better resolution of the synchronization of the data stream results. Likewise, less than four clock signals results in lesser resolution.

The four phase generator 16 has an external servo clock source input, as an alternative source for the internal reference clock source 14. A select input (Sel Ext) tells the four phase generator 16 which reference clock to choose from (that is, either the external (Sel Ext=0 $F_{ext}$) or internal (Sel Ext=1) reference clock $F_{ref}$) for generating the time-balanced signals. The four phase generator 16 further has two other select inputs (Sel0 and Sel1) which instruct the four phase generator 16 to generate the four time-balanced signals at a specified frequencies. In the preferred embodiment, the frequency of the time-balanced signals is approximately four times the data rate of the incoming data stream.

In the preferred embodiment, the four phase generator 16 can generate the time-balanced clock signals at 4 different frequencies. Specifically, the generator 16 can output the time-balanced signals at the same frequency as that of the input clock signals to the four phase generator $F_{ref}$ or $F_{ext}$ (Sel1=0, Sel0=1), at ½ of $F_{ref}$ or $F_{ext}$ (Sel1=1, Sel0=0), ⅓ of $F_{ref}$ or $F_{ext}$ (Sel1=0, Sel0=0) or at ¼ $F_{ref}$ or $F_{ext}$ (Sel1=1, Sel0=1). Since it is preferred that the frequency of the four time-balanced signals are four times the data rate of the asynchronous data stream and that this data rate varies from one type of servo device to another, it is preferred that four phase generator 16 can be versatile to synchronize to these varying data rate; ergo, the four frequencies capability. The four phase generator further has an input for the Aquire signal of the Servo timer used in calibration of the time-balanced signals as will be explained in more detail later.

The four phase generator 16 feeds the time-balanced signals to a data phase tracker 18 which synchronizes and tracks the asynchronous data stream, and generates a synchronous clock therefrom. As will be explained in more detail later, the data phase tracker 18 uses the four time-balanced signals Ph1–Ph4 to generate 16 sample phase windows. The "1"bits of the asynchronous data stream will be received within one of these phase windows per incoming bit. Depending on which window the bit is received in, that will determine which of the time-balanced signals is closest in phase with the phase of that data bit; and thus, it will be the basis for forming the synchronous clock.

The data phase tracker 18 further has inputs for receiving the Aquire and Track signals of the servo timer control lines. The Aquire signal is asserted at the beginning and during a servo field. Accordingly, when the data phase tracker 18 receives the Aquire signal it begins sampling the data stream in order to generate a synchronous clock that is in synchronous with and tracks the asynchronous data stream. The Track signal is asserted when the Aquire signal is asserted; however, the Track signal is de-asserted during the transmission of the A,B&C servo bursts of the servo field. The A,B&C servo burst is usually at the same data rate as the Grey code data rate, but it is can be displaced in time due to head response or aliasing of the servo device. Therefore, in order for the data phase tracker 18 not to declare a tracking failure, the Track signal is de-asserted during the transmission of the servo burst.

Each of the units of the data synchronizer and tracker 10 preferably has an input for resetting the components and for power management. Resetting each of the units is preferred since it is not known at which state the devices in these units are in when the data synchronizer and tracker 10 is turned on. A reset signal can be applied to each of the units so that each of the devices therein resets to a known state. Preferably, it is after this that synchronizing and tracking can occur. Each of the units in the data synchronizer and tracker 10 further include an input for receiving power management instructions.

Referring to FIG. 2, a block diagram of the low power oscillator 12 is shown. The oscillator 12 preferably comprises a crystal 20 coupled to the inputs of a pair of differential amplifiers 22a and 22b and to the output of differential amplifier 22a. The oscillator 12 further includes a tank circuit 22 comprising capacitor C1 in parallel with inductor L1, and both of which are connected in series with grounded capacitor C2. The tank circuit 22 is also coupled to the inputs of the pair of differential amplifier 22a and 22b and to the crystal 20. The clock signal $F_{osc}$ is taken off the output of differential amplifier 22b. Typical values of the tank circuit components are shown in the table below for a clock signal $F_{osc}$ of 12 and 40 MHz.

| Tank Circuit Elements | Clock Frequency ($F_{osc}$) | |
| --- | --- | --- |
|  | 12 MHz | 40 MHz |
| C1 (pF) | 80 | 10 |
| L1 (uH) | 2 | 0.75 |
| C2 (pF) | 0.001 | 0.001 |

The clock source 14 generally comprises a conventional divide-by-two circuit with a conventional gate that can selectively allow the clock signal $F_{osc}$ to propagate through it; thereby generating a reference clock signal $F_{ref}$ to be equal to ½ $F_{osc}$. Otherwise, the gate would be turned off and allow the clock signal $F_{osc}$ to propagate to the output without propagating through the divide-by-two circuit.

Referring to FIG. 3A, a block diagram of the four phase generator 16 is shown. The four phase generator 16 comprises a multiplexer 30 for selecting which reference clock to use for generating the time-balanced signals. The multiplexer 30 has inputs for receiving the internal reference clock $F_{ref}$, the external reference clock $F_{ext}$ and the Sel Ext signal which indicates which clock to choose from. The multiplexer 30 determines the state of the Sel Ext signal, and gates the selected clock to its output in accordance with the state of that signal.

The output of the multiplexer 30 is coupled to a four bit ring counter 32, to a divide-by-three circuit 34 and to a second multiplexer 36, for transmission of the selected reference clock thereto. The four bit ring counter generates four time-balanced signals at the ½ or ¼ the frequency of the selected clock. These time-balanced signals are 90 degrees out of phase with respect to each other. The four bit ring counter 32 is responsive to the select inputs Sel1 and Sel2, for outputing the time-balanced signal at a frequency of either ½ times (Sel1=1, Sel0=0) or ¼ times (Sel1=1, Sel0=0) the frequency of the selected clock.

The combination of the divide-by-three circuit 34, the second multiplexer 36 and a tapped delay line circuit 38 are used to form four time-balanced signals that are 90 degrees out of phase with respect to each other, and that oscillate at a frequency of either at the frequency of the selected clock or ⅓ of that frequency. More specifically, the selected clock signal from the output of multiplexer 30 is fed directly to the second multiplexer 36 and by way of the divide-by-three circuit 34. The multiplexer 36 is responsive to the select signals (Sel1, Sel0) and selects whether to output the selected clock reference that is directly fed into the second multiplexer 36 from the multiplexer 30 (Sel1=0, Sel0=0) or whether to output the selected clock reference that has propagated through the divide-by-three circuit 34 (Sel1=0, Sel0=1).

If the multiplexer 36 is operated to select the selected clock reference that is fed directly from multiplexer 38, then the tapped delay line circuit 38 will generate four time-balanced signals that are 90 degrees out-of-phase with respect to each other, and at the same frequency as the selected clock. On the other hand, if the multiplexer 36 is operated to select the selected clock reference that propagates through the divide-by-three circuit 34, then the tapped delay line circuit 38 generates four time-balanced signals that are 90 degrees out-of-phase with respect to each other, and at a frequency of ⅓ that of the selected clock.

Both time-balanced signals generated by the four bit ring counter 32 and the tapped delay line circuit 38 are fed to a third multiplexer 40. The third multiplexer 40 is responsive to the select signals Sel1 and Sel2, wherein it will pick either the time-balanced signals generated from the four bit ring counter 32 (Sel1=1, Sel0=1 or 0) or from the tapped delay line circuit 38 (Sel1=0, Sel0=0 or 1) depending on the state of the select signals as bracketed. Therefore, the output of the multiplexer 40 will be four time-balanced signals, each of which are preferably 90 degrees out-of-phase from each other ($F_{0°}$, $F_{90°}$, $F_{180°}$, $F_{270°}$). These time-balanced signals will preferably be at a frequency approximately four times the data rate of the asynchronous data stream. The time-balanced signals are then fed to the data phase tracker 18 for use in synchronizing and tracking the asynchronous data stream.

Referring now to FIG. 3B, a timing diagram of the four time-balanced signals at the output of the multiplexer 40 is shown. The time-balanced signals have a phase that preferably differs with respect to the phase of the other time-balanced signal by 90 degrees. If one of the time-balanced signal is designated as having a phase of 0 degrees (Ph0, or preferably $F_{0°}$), then the other three time-balanced signals will preferably have a relative phase of 90 degrees (Ph1, preferably $F_{90°}$), 180 degrees (Ph2, preferably $F_{180°}$) and 270 degrees (Ph3, preferably $F_{270°}$). Also note in FIG. 3B that for each period of a time-balanced signal, the combination of time-balanced signals will produce four rising edges. If the frequency of the time-balanced signals is at approximately four times the data rate of the asynchronous data stream, then the time-balanced signals will produce 16 rising edges between consecutive bits of the data stream. As will be explained in more detail later, the time-balanced signals will be used to clock a plurality of shift registers or more generally delay lines that will set up 16 sample time windows for sampling the data stream.

Referring now to FIG. 4A, a block diagram of the four bit ring counter 32 is shown. The four bit ring counter 32 comprises four latches 42a–d. The Q-output of latch 42a is coupled to the data input of latch 42b and also serves to output the 0 degree phase $F_{0°}$ (Ph0) of the time-balanced signals. Similarly, the Q-output of latch 42b is coupled to the data input of latch 42c and serves to output the 90 degree phase $F_{90°}$ (Ph1) of the time-balanced signals. The Q-output of latch 42c is coupled to the data input of latch 42d and also serves to output the 180 degree phase $F_{180°}$ (Ph2) of the time-balanced signals. And the Q-output of latch 42d serves to output the 270 degree phase $F_{180°}$ (Ph3) of the time-balanced signals.

The $\overline{Q}$-output of latch 42b is coupled to the data input of latch 42a. The selected clock reference at the output of multiplexer 30 of the four phase generator 16 is coupled to the clock input of latches 42a and 42c. The selected reference clock is also fed to a select circuit comprising an inverter 44 and three NAND-gates 46a–c. The select circuit is used for allowing selection of the time-balanced signals to oscillate either at ½ or ¼ times the frequency of the selected clock. More specifically, the selected reference clock is applied to inverter 44 and to one of the inputs of NAND-gate 46b. The other input of NAND-gate 46b receives the select signal (Mode ¼) for selecting the frequency of the time-balanced signal to be ¼ times that of the selected clock. The output of the inverter 44 is coupled to one of the inputs of NAND-gate 46a. The other input of NAND-gate 46a receives the select signal (Mode 1/2) for selecting the frequency of the time-balanced signal to be ½ times the frequency of the selected clock. The outputs of both NAND-gates 46a and 46b are coupled to the inputs of NAND-gate 46c, whose output is, in turn, coupled to the clock input of latches 42b and 42d.

Referring both to FIGS. 4A and 4B, where FIG. 4B depicts a timing diagram of the four ring bit counter, if the select signal is set for producing time-balanced signals having a frequency of ¼ times the frequency of the selected clock (that is, Mode ¼=1 and Mode ½=0), then the output of NAND-gate 46c cycles in phase with the selected reference clock. As a result, the four latches 42a–42d connected in series, simply divides the frequency of the selected reference clock by four, wherein the $\overline{Q}$-output of latch 42b feeding back to the data input of latch 42a provides the basis for changing the propagating bit every cycle. Thereby, resulting in four time-balanced signals ($F_{0°}$, $F_{90°}$, $F_{180°}$, $F_{270°}$) at a frequency ¼ times that of the selected clock. If, on the other hand, the select signal is set for producing four time-balanced signals at a frequency of ½ times the frequency of the selected clock (that is, Mode ¼=0 and Mode ½=1), then the output of NAND-gate 46c cycles at 180 degrees out-of-phase with the selected reference clock. This results in the $\overline{Q}$-output of latch 42b changing the propagating bit every half cycle and thus produces time-balanced signals at a frequency of ½ times the frequency of the selected clock.

Referring now to FIG. 5A, a block diagram of the divide-by-three circuit 34 is shown. The divide-by-three circuit 34 comprises three latches 48a–c, a NAND-gate 50 and an inverter 52. The Q-output of latch 48a is coupled to one of the inputs of NAND-gate 50. The Q-output of latch 48b is coupled to the data input of latch 48c; and the $\overline{Q}$-output of latch 48c is coupled to the data input of latch 48a and also to the other input of NAND-gate 50. The output of NAND-gate 50 is coupled to the data input of latch 48b and also serves as the output of the divide-by-three circuit 34 for producing a clock signal having a frequency one-third of that of the selected clock. The selected clock is applied to the clock input of latches 48a and 48b, and also to the clock input of latch 48c by way of inverter 52.

Referring now to both FIGS. 5A and 5B, where FIG. 5B depicts the timing diagram of the divide-by-three circuit 34, the operation of the circuit will now be explained. The signal at the Q-output of latch 48a has a rising edge in phase with the selected clock, but oscillates at a frequency of ¼ of that of the selected clock. The signal at the Q-output of latch 48b cycles at a 25 percent duty cycle and in a phase relationship with the signal at the Q-output of latch 48a, where their respective falling edges occur at the same time. The signal at the Q-output of latch 48c cycles at a 25 percent duty cycle and in a phase relationship with the signal at the Q-output of latch 48b, where the falling edge of the signal at the Q-output of latch 48b occurs half way between the on-cycle of the signal at the Q-output of latch 48c. The result is that at the output of NAND-gate 50, a clock signal is produced having a rising edge in phase with a rising edge of the selected clock, but at a frequency of ⅓ that of the selected clock.

Referring now to FIG. 6, a block diagram of the tapped delay line circuit 38 is shown. The tapped delay line circuit 38 comprises a tapped delay line 54 having an input for receiving the selected clock (or ⅓ the frequency selected reference clock) by way of gate 56. The tapped delay line 54 comprises a plurality of delay stages basically consisting of logic elements, such as inverters and NAND-gates, connected in series to achieve a certain delay as the clock signal propagates through them. In the preferred embodiment, there are 78 delay stages, 32 of which are designed to achieve a delay of approximately one-nano second each, and the other 46 are designed to achieve a delay of approximately two-nano second each.

The outputs of the delay stages are coupled to a tap sample register 58. The tap sample register 58 samples the signal at the outputs of each delay stage of the tapped delay line 54 for analysis thereof. In the preferred embodiment, the tap sample register 58 is coupled to the output of the last 68 delay stages. The 68 bit outputs of the tap sample register 58 are coupled to a tap select decode 60. The tap select decode 60 contains logic, as will be later shown in more detail, that determines which stage of the tapped delay line 54 holds the last point of the one cycle of the selected clock that propagated into the tapped delay line 54. Once the last point of a period has been determined, the tap select decode 60 selects the taps that generate the phases 90, 180 and 270 degrees of the four time-balanced signals.

Referring to FIG. 7, a table showing which delay line taps output the phases 90, 180 and 270 degrees of the four time-balanced signals for a given selected latch holding the last point of the one cycle of the selected clock that has propagated into the tapped delay line 54. The table shows four columns labeled the ¼ tap (or 90-degree tap), the ½ tap (or 180-degree tap), the ¾ tap (or 270-degree tap) and the selected latch. As previously explained, the tap select decode 60 determines which tap outputs the last point of a period of the selected clock that propagated into the tapped delay line 54. The selected latch column will designate which tap is such last point of the period. Once the selected latch is determined, the tap select decode 60 looks at the ¼, ½ and ¾ tap columns being in the same row as the selected latch to choose the proper taps for the 90, 180 and 270 degree phases of the four time-balanced signals. For example, if the selected latch is tap 20, then the ¼, ½ and ¾ taps are taps 5, 10 and 15, respectively. If, on the other hand, the selected latch is tap 39, then the ¼, ½ and ¾ taps are taps 11, 23 and 33, respectively. The selection process can be performed by way of conventional methods such as with a look-up table rom, microprocessor or appropriate logic.

Referring back to FIG. 6, the tap select decode 60 is coupled to tap select gates 62 for gating the appropriate tap outputs for the 90, 180 and 270 degree phases of the four time-balanced signals. More specifically, the tap select decode 60 comprises a plurality of gates each having an input coupled to a corresponding tap of the tapped delay line 54, and an input coupled to the tap select decode 60. After the tap select decode 60 determines which taps corresponds to the 90, 180 and 270 degree phases of the time-balanced signals, the tap select decode 60 will issue a signal to the tap select gates to open the appropriate gates to output the proper time-balanced signals.

The tap select decode 60 is coupled to 30-way OR-gate 64a, 44-way OR-gate 64b and 41-way OR-gate 64c. The inputs of the 30-way OR-gate 64a are coupled to the gates of the tap select gates 62 that gate the outputs of taps 2 through 31; this is the range of taps that the 90 degree phase time-balanced signal is going to fall within. The inputs of the 44-way OR-gate 64b are coupled to the gates of the tap select gates 62 that gate the outputs of taps 5 through 47; this is the range of taps that the 180 degree phase time-balanced signal is going to fall within. The inputs of the 41-way OR-gate 64c are coupled to the gates of the tap select gates 62 that gate the outputs of taps 10 through 62; this is the range of taps that the 270 degree phase time-balanced signal is going to fall within. The zero degree phase time balanced signal need not be gated out because it is present at the output of the gate 56. The purpose of the mult-inputs OR-gates is so that the tap delay line circuit 38 has four outputs capable of outputting the four time-balanced signals to multiplexer 40 for selection thereof.

The tap delay line circuit 38 further includes a calibration state counter 66, which has outputs coupled to gate 56 and tap sample register 58. The purpose of the calibration counter 66 is to calibrate the selection of the taps of the tapped delay line 54 so that the tap delay line circuit 38 produces the four time-balanced signals at its outputs. Calibration occurs during times when the asynchronous data stream is not being transmitted; and more specifically, when the Aquire signal is de-asserted. Upon detection of the Aquire signal being de-asserted, the calibration state counter 66 will cause the tap sample register 58 to reset; then it will cause gate 56 to open to allow a single period of the selected clock to propagate into the tapped delay line 54; and then after that period of the selected clock has propagated into the tapped delay line 54, the calibration state counter 66 will cause the tap sample register 58 to sample the output of the last 68 delay stages of the tapped delay line 54 for determination of the taps corresponding to where the phases of the propagated selected reference clock is at 90, 180 and 270 degrees.

Referring now to FIG. 8A, a block diagram of the calibration state counter 66 is shown. The calibration state counter 66 comprises four latches 68a–d, an OR-gate 76, three AND-gates 70, 72 and 74, and a NAND-gate 78. The AND-gate 70 has inputs for receiving the de-asserted $\overline{\text{Aquire}}$ signal, the $\overline{\text{Q}}$-output of latch 68d ($\overline{\text{L3}}$), the Mode 1 signal and an IFClear signal which is a signal feedback from the data phase tracker 18 that tells the calibration state counter 66 that calibration is allowed. The output of the AND-gate 70 is coupled to the data input of latch 68a. Therefore, when the inputs to the AND-gate 70 are all "1" and consequently the output of AND-gate 70 is a "1", then latch 68a will be latching "1"s to its Q-output during each falling edge of the selected clock.

The selected clock inverted is applied to the clock input of latches 68a–68d. The Q-output of latch 68a is coupled to the data input of latch 68b and to a first input of AND-gate 72. Latch 68b has a Q-output coupled to the data input of latch 68c and a $\overline{\text{Q}}$-output coupled to a second input of AND-gate 72 and a first input of AND-gate 74. The output of AND-gate 72 is coupled to the tap sample register 58 which provides a signal that resets the tap sample register. Latch 68c has a Q-output coupled to a second input of AND-gate 74 and to a first inverted input of OR-gate 76. The output of AND-gate 74 is coupled to the gate 56 for providing a signal which causes the gate to open and allow a single cycle of the selected clock to propagate into the tapped delay line 54.

The NAND-gate 78 has inputs for receiving the de-asserted $\overline{\text{Aquire}}$ signal, the Mode 1 signal and the Q-output of latch 68d (L3). The output of NAND-gate 78 is coupled to a second inverted input of OR-gate 76 which, in turn, has an output coupled to the data input of latch 68d. Latch 68d has a Q-output coupled to an input of NAND-gate 78 and a $\overline{Q}$-output coupled to AND-gate 70.

Referring to FIG. 8B, a timing diagram of the signals of the calibration state counter 66 is shown, and the operation of the counter will now be explained. Upon the Aquire signal being de-asserted (that is, $\overline{\text{Aquire}}$="1" and meaning that the asynchronous data stream is not being transmitted); the IFClear signal from the data phase tracker 18 indicating that calibration of the taps is allowed (IFClear="1"); the Mode 1 signal is asserted meaning that the four phase generator 16 is being operated in either Mode 1 or ⅓; and the $\overline{Q}$-output of latch 68d being in the reset state is high or a "1", then the output of the AND-gate 70 goes high or "1". Once this occurs, the "1" will propagate to the Q-output of each successive latch (68a–d) when a falling edge of the selected reference clock occurs. Since the inputs to AND-gate 72 are coupled to the Q-output of latch 68a and the $\overline{Q}$-output of latch 68b, the output of AND-gate 72 will go high when the Q-output of latch 68a goes high, but will go low when the Q-output of latch 68b goes low. This causes the tap sample registers 43 to be reset early in the timing sequence and prior to calibration.

When the initial "1" propagates to the Q-output of latch 68d, a "0" will be present at the data input of latch 68a since the $\overline{Q}$-output of latch 68d will be "0" and is fed back to the input of AND-gate 70. Thus, thereafter "0"s will be propagating to the next successive Q-output of each latch each time there is a falling edge of the selected reference clock. Since the inputs of AND-gate 74 are coupled to the $\overline{Q}$-output of latch 68b and to the Q-output of latch 68c, the output of the AND-gate 74 goes high when a "0" propagates to the Q-output of latch 68d, during the "0" propagation sequence. This occurs later in the timing sequence and thus causes gate 56 to open after the tap sample registers have been reset; thereby allowing the selected clock to propagate into the tapped delay line 54 for calibration. The purpose of the lag between the resetting of the tap sample registers 58 and the opening of the gate 56 is to allow sufficient time for any signal present in the tapped delay line 54 to propagate out; thereby, clearing the tapped delay line prior to a calibration event.

The output of AND-gate 74 will go low thereafter when one or both of its inputs goes low. This occurs when the "0" propagates to the Q-output of latch 68c; one selected clock cycle after the gate 56 opens and causes the output of the AND-gate 74 to be a "0", and thus closes gate 56. Therefore, only one cycle of the selected clock is allowed to propagate into the tapped delay line 54. The output of AND-gate 74 is also coupled to the clock input of the tap sample register 58 in a manner that the falling edge of the signal at the output of the AND-gate 74 will cause the tap sample register 58 to sample the output of each delay stage of the tapped delay line 54. Thus, the tapped delay line 54 is sampled immediately after one cycle of the selected clock has propagated into the tapped delay line 54. The purpose of NAND-gate 78 is to keep the Q-output of latch 68d high and, in turn, prevent a high from $\overline{Q}$ from being applied to the AND-gate 70 so as to prevent the calibration process to repeat itself.

Referring to FIG. 9, a block diagram of a representative single stage of the tapped delay line 54, the tap sample register 58, the tap select decode 60 and the tap select gates 60 are shown. This circuit is representative of the 77 other delay stages of the tapped delay line 54, and the others will be configured likewise. A single delay stage 54a of the tapped delay line 54 is shown being coupled to gate 56 for receiving the selected clock, although it could be indirectly coupled to gate through other delay stages. The output of the delay stage 54a is coupled to an inverting buffer 80a whose output, in turn, is coupled to the data input of a corresponding register 58a of the tap sample register 58 and to a corresponding tap select gate or gates 62a of the tap select gates 62.

The output of delay stage 54a is coupled to the data input of single stage register 58a of the tap sample register 58 by way of inverting buffer 80a. The selected clock is applied to the clock input of register 58a. Since each delay stage has an inverting buffer at its output, such as inverting buffer 58a of delay stage 54a, the data at the output of each delay stage will be clocked to the tap select decode 60 by way of the $\overline{Q}$-output of the tap sample register 58, such as register 58a. Accordingly, the Q-output of the tap sample register 58a will produce the data at the inverted output of each delay stage. The signal at the output of AND-gate 72 of the calibration state counter 66 is applied to the inverted reset input of the tap sample register, such as register 58a. This causes the tap sample register 58 to reset by the falling edge of the signal at the output of AND-gate 74 and prior to a calibration event.

The tap select decode 60 comprises a plurality of tap decodes, preferably 68 of them, such as the one shown in FIG. 9 as reference number 60a. Each decode comprises a couple of NAND-gates 82a and 82b, a couple of OR-gates 84a and 84b having inverted inputs, and a couple of inverters 86a and 86b. Each tap select decode, such as 60a is coupled to the tap sample register 58 by way of one of the inputs of NAND-gate 82b being coupled to a corresponding Q-output of each tap sample register, such as 58a, and one of the inputs to NAND-gate 82a being coupled to the $\overline{Q}$-output of each tap sample register, such as 58a.

Since only one cycle of the selected clock propagates into tapped delay line 54, and preferably leading with a half of cycle of ones ("1"s) followed by a half of cycle of zeros ("0"s), the function of the tap select decode 60 is to first. determine a first rising edge, then determine a second falling edge, wherein the bit (selected tap) following the second falling edge denotes the end of one period. When the tap that corresponds to this bit is determined, then the tap select decode 60 can determine the phases 90, 180 and 270 degree according to the table of FIG. 7, by way of many conventional manners, such as by a look-up table, microprocessor or appropriate logic.

Therefore, part of the tap select decode 60 circuit is to detect a first rising edge of the tapped delay line outputs. After it detects the first rising edge, it provides a signal to the second rising edge detection circuit, which, in turn, detects the next falling edge. The combination of the NAND-gate 82a, OR-gate 84a and inverter 86a form the portion of the tap select decode 60a that detects the first rising edge. The combination of the NAND-gate 82b, OR-gate 84b and inverter 86b form the portion of the tap select decode 60a that detects the subsequent falling edge, and consequently, the tap that outputs the last bit of the one cycle period of the selected clock that propagated into the tapped delay line 54.

In more detail, the inverter 86a is coupled to the first edge carry output of the previous tap. The output of the inverter 86a is coupled to a first input of the NAND-gate 82a and to a first inverting input of OR-gate 84a. The NAND-gate 82a further has a second input coupled to the inverting tap output of the previous tap, and an output coupled to a second inverting input of OR-gate 84a. The inverter 86b has an input coupled to the second edge carry out of the previous stage and an output coupled to a first input of NAND-gate 82b and to a first inverting input of the OR-gate 84b. The NAND-gate 82b has a second input coupled to the non-inverting output of the previous delay stage tap, and an output coupled to an inverting input of OR-gate 84b. The NAND-gate 82b has a third input coupled to the first edge carry out of the previous stage. The output that indicates whether that stage holds the last bit of the one cycle period of the selected clock is taken off the output of NAND-gate 82b.

In operation, the first edge detect portion (NAND-gate 82a, OR-gate 84a and inverter 86a) outputs a "0" if all the outputs of the previous taps are "0"s and outputs a "1" if any of the previous bits is a "1." According to its function, the first edge detect portion will produce a "1" at the first edge carry out for all stages after the first rising edge has been detected. That output is applied to an input of the NAND-gate 82b which serves to enable the second edge detect portion to detect the next falling edge. The second edge detect portion looks for the first "0" after the first edge detect portion has enabled the second edge detect portion. When this occurs, the output of the NAND-gate 82b is a "0" indicating that the present stage holds the last bit of the period; otherwise, it would be a "1" indicating that the present stage does not hold the last bit of the period.

This information taken off the output of the NAND-gate 82b is subsequently used by, for example, a microprocessor, look-up table or appropriate logic to select the taps outputing the 90, 180 and 270 degree phases of the four-time balanced signals in accordance with the table shown in FIG. 7. Once the taps outputing the 90, 180 and 270 degree phases of the time-balanced signals are determined, a signal is sent from the tap select decode 60 to the tap select gates 62 to enable the appropriate gates therein to output the time-balanced signals.

Each of the stages of the tap select gates comprises one or two or three of the three AND-gates 88a, 88b and 88c, depending on the tap number; where each of these gates serve to gate the 90, 180 and 270 degree phases of the time-balanced signals to its outputs. For instance, taps 2 through 4 will only have AND-gate 88a for each stage since those taps can preferably output only the 90 degree phase (Ph1) of the time-balanced signals. Whereas, taps number 5 and 6 will have both AND-gates 88a and 88b for each stage since these taps could preferably either output the 90 (Ph1) or 180 (Ph2) degree phases of the time-balanced signals. The select gate stages corresponding to taps 7 through 31 will have all three AND-gates 88a, 88b and 88c for each stage since these taps could either output the 90 (Ph1), 180 (Ph2) and 270 (Ph3) degree phases of the time-balanced signals. The select gate stages corresponding to taps 32 through 47 will have both AND-gates 88b and 88c for each stage since these taps can preferably output either the 180 (Ph2) or the 270 (Ph3) degree phases of the time-balanced signal. Finally, the tape select gate stages corresponding to gates 48 through 62 have only AND-gate 88c for each stage since these taps can preferably output only the 270 (Ph3) degree phase of the time-balanced signals.

Each of the AND-gates 88a, 88b and 88c has an inverted input coupled to the inverted output buffer of the corresponding tap and an inverted input coupled to either the select ¼ (90 degree) phase select signal, the select ½ (180 degree) phase select signal and the select ¾ (270 degree) phase select signal generated by the tap select decode 60 for enabling the appropriate phases. The outputs of AND-gates 88a, 88b and 88c are coupled to the inputs of 30-way OR-gate 64a, 44-way OR-gate 64b and 41-way OR-gate 64c, depending on the number of the corresponding tap as explained earlier. The 90, 180 and 270 degree phases to the time-balanced signals will be produced at outputs of the mult-inputs OR-gates.

FIGS. 10A, 10B and 10C show a block diagram of the data phase tracker 18 as embodied in the invention, along with a timing diagram of the tracker input and output signals, and a timing diagram of the asynchronous data stream in time-relationship with the sample windows established by the tracker, respectively. The data phase tracker 18 comprises an AND-gate 90 having inputs for receiving the Aquire and Track signals from the servo device, and an output coupled to the data input of latch 92. The latch 92 has a clock input for receiving the asynchronous data stream. Because the data stream consists of "1"s and "0"s and a pulse in the data stream represents a "1" and an absence of a pulse represents a "0", applying the data stream to the clock input of latch 92, results in the data stream being clocked to the Q-output of latch 92. The Q-output of the latch 92 is applied to the common data input of phase sample registers 94.

The phase sample registers 94 comprises plurality of delay lines, such as four 5-bit individual shift registers 94a–d having each a data input coupled to the Q-output of latch 92. Each of the individual shift registers 94a–d has a clock input for receiving one of the time-balanced signals; and preferably, the 0, 90, 180 and 270 degree phases of the time-balanced signals are applied to the clock inputs of shift registers 94a–d, respectively. Since the clocking edge of the time-balanced signals occur at four different times during a period of the time-balanced signals and at equal intervals, the clocking of data into the phase sample registers 94 will cycle from the individual shift registers 94a–d in a repetitive manner. The data rate of the asynchronous data stream is preferably much slower than the frequency of the time-balanced signals; and in the preferred embodiment, at a data rate of ¼ the frequency of the time-balanced signals. Therefore, for each bit time of the data stream, the phase sample registers 94 is clocked 16 times; thereby, establishing 16 sampling windows.

The function of the data phase tracker 18 is to synchronize the incoming data stream and develop a corresponding synchronous clock therefrom. The data phase tracker 18 performs this function by determining which of the time-balanced signal has a clocking edge closer in phase with the incoming data of the data stream. As the data appears at the Q-output of latch 92, the phase of the time-balanced signal with the closest and subsequent in time to the data appearing at the Q-output of latch 92 clocks the data into its corresponding individual shift register. For instance, if the clocking edge of the 90 degree phase time-balanced signal is the closer in phase and subsequent to the data appearing at the Q-output of latch 92, it will clock the data at the Q-output of latch 92 into individual shift register 94b. Because the frequency of the time-balanced signals are preferably four times the data rate of the data stream, the data received will propagate to the fifth bit of the phase sample registers 94, by the time the next data is clocked into the first bit. If the next data is also clocked into the same individual shift register as the prior data, then that is a further indication that the 90 degree phase of the time-balanced signal is more in-phase with the incoming data stream than the other phases of the time-balanced signals.

The data phase tracker 18 further includes a shadow phase sample registers 96 comprising four LE individual holding registers 96a–96d, each of which are four bits long. Each of the individual registers 96a–96d are coupled to individual shift registers 94a–94d, respectively, and also aligned with respect to each other so that the first through fourth bits of shift registers 94a–94d are in data communication with the first through fourth bits of registers 96a–96d, respectively. As will be explained in more detail later, the shadow phase sample register 96 is preferably clocked at ¼ the frequency of the time-balanced signals; approximately the data rate of the data stream. The contents of the phase sample registers 94 are parallel loaded to the shadow phase sample register 96 every 16 sampled windows for analysis thereof, for determining a starting code and for generating a clock synchronous with the data derived from one of the time-balanced signals that is closer in-phase to the incoming data than the other phases of the time-balanced signals.

The shadow phase sample register 96 is coupled to a start control unit 100. Generally, the start control unit 100 examines the content of the shadow phase sample register 96 and determines whether it is appropriate to start synchronization of the data. If it has determined that it is appropriate to start synchronization of the data, it instructs a phase select and shift control unit 102 to output the appropriate phase of the time-balanced signals that is closest in-phase with the data received in the shadow registers 96. As will be explained in more detail later, the start control unit 100 examines the fifth position of the phase sample register 94 and compares it to the data content of the shadow phase sample registers 96, to determine whether the two consecutive "1" bits were both received within one of registers 96a–96d. If so, then the start control unit 100 instructs the phase select shift control 102 to output the appropriate phase of the time-balanced that clocks the selected register. The start control can also issue a start signal if the previous consecutive bit is one sample window off of what it should be.

Once the phase select and shift control unit 102 receives the start code from the start control unit 100, it applies the selected time-balanced signal to a tracking ring counter 106. Since the frequency of the time-balanced signal is preferably four times the data rate of the data stream, the tracking ring counter 106 is preferably a divide-by-four counter that divides the frequency of the selected phase of the time-balanced signal by four; thereby, producing a clock that approximates the data rate of the data stream and in synchronous therewith.

The synchronous clock signal is applied to multiplexer 108 that selects either the synchronous clock signal at the output of the tracking ring counter 106 or a clock signal from a phase 0 degree counter 104, which generates a clock having a rising edge in-phase with that of the 0 degree phase time-balanced signal but at a frequency ¼ of that signal. The phase 0 degree counter 104 is a divide-by-four counter such as the tracking ring counter, but always has phase 0 of the time-balanced signal as its input clock. The multiplexer 108 selects the output of the phase 0 degree counter 104 during a de-assertion of the Aquire signal (that is, during non-servo data field delivery). The signal is applied to counters (not shown) for keeping track of the rotational position of the servo device during no transmission of the servo field data.

After the start control unit 100 has provided the start signal to the phase select and shift control unit 102, control of this unit is transferred to the velocity error register 110 and the phase position decode 112. The phase position decode 112 determines which phase of the time-balanced signals has clocked the next data bit and compares that to the current phase selected by the phase tracker. If the phases are the same, the phase position decode 112 does not issue a shift instruction to the phase select and shift control unit 102. If, however, the current phase and the phase of the next data bit are not the same, the phase position decode 112 issues a "shift the current phase" instruction to the phase select and control unit 102 in order to keep the clock in synchronous with the incoming data. Thus, the phase position decode adjust for any phase shift in the incoming data stream that is due to noise or imperfections in the servo device.

The velocity error register 110 keeps track of how many shifts occur during a specified period. The velocity error register attempts to estimate the data rate of the data stream when transmission of numerous consecutive "0" bits occurs, when this occurs it is difficult for the data phase tracker 18 to develop a synchronous clock because there are no pulses received, and therefore, no timing information. In order to provide a good estimate of where the synchronous clock should be phase-wise during the transmission of numerous "0" bits, the velocity error register 110 counts the shifts that has occurred during a specified time. It stores this number of shifts per specified period in a register, and thus sends a signal to the phase select shift control unit 102 to shift the selected phase according to its estimate for every selected period. Thus, when the data phase tracker 18 encounters numerous consecutive "0" bits and thus no timing information is provided to the tracker, the data phase tracker 18 will shift the selected phase according to its estimate; thereby, attempting to keep in synchronous during transmission of consecutive "0" bits.

A certain portion of the shadow phase registers that hold acceptable data (see table of FIG. 15 for acceptable registers of the shadow phase register not resulting in a tracking error) from the asynchronous data stream are ORed to the data input of latch 98. That is, the acceptable data is communicated to the data input of latch 98 each bit time. The synchronous clock at the output of multiplexer 108 is applied to the clock input of latch 98. The synchronous clock clocks the data at the data input of latch 98 to the Q-output thereof. As a result, the data at the Q-output of latch 98 is in synchronous with the synchronous clock.

Referring now to FIG. 11, a block diagram of the phase sample register 94 is shown, including each of the individual shift registers 94a–94d. Each of the individual registers 94a–94d consists of a plurality of latches dX0–dX5 (where X ranges from 0 to 3 and corresponding to individual registers 94a–94d, respectively). These registers are clocked by the four time-balanced signals, and preferably, where the 0, 90, 180 and 270 degree phases of the time-balanced signals clock the latches in rows X=0 to 3, respectively. The latches in each row are connected in series in a manner that the Q-output of a previous latch is coupled to the data input of the next latch. Except that the Q-outputs of latches dX0 and dX1 are also coupled to the data inputs of latches dX1 and dX2, respectively, by way of AND-gates 114a–114d and AND-gates 116a–116d. That is, the Q-output of latches dX0 and dX1 is coupled to an input of AND-gates 114a–114d and 116a–116d, respectively. The $\overline{Q}$-output of latches dX0 and dX1 is coupled to inputs of the next row of AND-gates 114a–114d and 116a–116d, wherein the $\overline{Q}$-output of latches d30 and d31 is coupled to the inputs of the first row AND-gates 114a and 116d, respectively.

Four AND-gates 118a–118d have inputs coupled to the Q-output of latch 92 and outputs coupled to the data inputs of latches d00–d30, respectively. Each of the AND-gates 118a–118d have three other inputs coupled to the $\overline{Q}$-output of three of latches d00–d30 that is not within the same row at the corresponding AND-gate. The phase sample registers 94 also provides OR-gate 120 that has inputs for receiving the Q-output of latches d00–d30 and an output coupled to the reset input of latch 92.

In operation, the incoming asynchronous data stream is clocked to the output of latch 92 and is subsequently clocked into one of the rows of latches, depending on which clocking edge of the time-balanced signals is closer and subsequent in time to the appearance of the data at the output of latch 92. For example, if the clocking edge of the 90 degree time-balanced signal occurs immediately after the data bit has been clocked to the Q-output of latch 92, then that bit will be clocked to the output of latch d10 and subsequently to latches d11 through d15. The purpose of the cross coupling of the rows, that is where the Q̄-output latches d100–d30 and d01–d31 are coupled to the inputs of AND-gates in other rows as describe above is to insure that only one latch per column of latches is on for every incoming data bit. The purpose of OR-gate 120 is to reset latch 92 whenever a "1" bit is clocked to the Q-output of latches d00–d30; thereby, clearing latch 92 when data is received within one of the individual shift registers 94a–d.

Referring to FIG. 12A, a block diagram of a representative portion of the start control unit 100 of the invention is shown. The function of the start control unit is to examine the content of the shadow phase sample register 96 and determine whether the data bits received within the 16 sample windows represent data of the data stream, as oppose to bits generated by noise or imperfections in the servo device. If the start control unit 100 determines that data of the data stream has been received within the shadow phase sample register 100, it issues a start command to the phase select and shift control unit 102 so that the latter can apply the appropriate phase of the time-balanced signals to the tracking ring counter 106 for generating the synchronous clock. After it issues a start signal to the phase select and shift control unit 102, the start control unit 100 relinquishes control of the phase selection phase position decode unit 112 and the velocity error register 110. If the data phase tracker 18 goes out of synchronous with the data stream, the start control unit 100 will be enabled again to determine whether to issue another start command.

More specifically, the start control unit 100 comprises three latches Seta10, Seta11 and SetaP11 and two AND-gates 122 and 124 per each phase of the time-balanced signals. The one represented in FIG. 12A is part of the start control unit 100 that corresponds to the 90 degree phase (Ph1) of the time-balanced signal. The output of AND-gate 122 is coupled to the data input of latch Seta10, whose Q-output, in turn, is coupled to the data input of latch Seta11. The Q-output of latch Seta11 is coupled to an input of AND-gate 124, whose output, is coupled to the data input of latch SetaP1. The corresponding phase of the time-balanced signals is applied to the clock input of each of the latches Seta10 and Seta11, and to the inverted clock input of SetaP1; which in the case of the represented circuit in FIG. 12A, the 90 degree phase (Ph1) of the time-balanced signal clocks the latches.

The Q-output of each SetaP1 latch for all the phases of the time-balanced signals are applied to an OR-gate (not shown), whose output is, in turn, coupled to an input of AND-gates 126a–d. The other input to AND-gates 126a–d is coupled to registers d03, d13, d23 and d33, respectively, of the phase sample register 94 for receiving data therefrom. The outputs of AND-gates 126a–d are coupled to the data inputs of phase select latches 128a–d, respectively; wherein, the latches 128a–d are clocked by phases 0 (Ph0), 90 (Ph1), 180 (Ph2) and 270 (Ph3) degree of the time-balanced signals. The output of the OR-gate that ORs the outputs of the. SetaP1 latches is coupled to the phase select and shift control unit 102 for transmitting thereto the start signal.

The AND-gate 122 has an input for receiving data from register d15 of the phase sample register 94, and specifically from bit 5 of individual shift register 94b. Since part of the content of the phase sample register 94 is copied to the shadow phase sample register 96, the registers of the shadow register will be designated as the same reference number of the latches of the phase sample register 94 from which it receives data, but adding a prime to distinguish therefrom. The AND-gate 122 has further inputs for receiving the Aquire signal, the NOT of the Q-output of each phase select latch 128a–d and the NOT of the output of the AND-gate 122 of the part of the start control circuit corresponding to the other three phases.

Referring to FIG. 13, a block representation of the phase sample registers 94 is shown, and is useful in explaining how the start control unit 100 determines whether the data bits received by the phase sample register 94 represents data from the incoming asynchronous data stream. A servo data field transfer usually begins with the transfer of a synchronous code, generally consisting of numerous consecutive "1"s or pulses. As the data stream, and particularly the synchronous code, presents itself to the input of the phase sample register 94 by being clocked to the output of latch 92, a "1" of the synchronous code is thereafter clocked into one of the individual shift registers 94a–d. The "1" bit will be clocked into the particular individual shift register whose corresponding phase of the time-balanced signals issues a clocking edge first after the "1" bit is presented. This phase of the time-balanced signals is closest in phase to the incoming asynchronous data stream. In the example shown in FIG. 13, the first "1" bit was clocked into individual shift register 94b, which, in turn, is clocked by the 90 degree phase (Phase 1) of the time-balanced signals.

Since the frequency of the time-balanced signals is greater than the data rate of the incoming asynchronous data stream, and preferably four times faster, the bit that entered latch d10 of individual shift register 94b will propagate to latch d15 by the time the next bit is in the second column of latches, i.e. latches d01, d11, d21 and d31. If the data rate of the asynchronous data stream is constant, it would be expected that the next "1" bit would be at latch d11 when the first "1" is at latch d15. Therefore, the function of the start control unit 100 is to determine where in the phase sample register the first "1" bit is in and where the second bit is in. If the two consecutive "1"s are in the same shift register, that would represent a capture of incoming asynchronous data stream; and therefore, the start control unit 100 will issue an instruction to the phase select and shift control unit 102 to output the appropriate phase of the time-balanced signals (the phase that clocked the shift register that the "1" bits are in).

In the example shown in FIG. 13, the first "1" bit entered individual shift register 94b and then propagated to latch d15 (shown as a single asterisk). The next "1" bit, for example, entered the same individual shift register 94b and propagated to latch d11 (shown as a double asterisk). After the first and second consecutive bits arrive at latches d15 and d11, respectively, the content of the phase sample clock 94 is sampled into the shadow phase sample register 96. The start control unit 100 examines the content of the shadow phase sample register 96, and then issues a start code if it determines that asynchronous data stream has been capture. In the example, because the first and second consecutive "1" bits arrived at latches d15 and d11, the start control unit would determine that a data stream has been capture and then issue a start code.

Because the data rate of the asynchronous data stream, by definition, is not constant and may vary, as mentioned earlier, due to such events as rotational variation of the servo device, noise, movement and electromagnetic interference, it is preferred that the start control unit 100 issues a start code, even though the next subsequent bit is not clocked into the same individual shift register. In the preferred embodiment, for instance, the start control unit 100 allows for an error of one sampling window in issuing the start code. For example, if the next "1" bit lags or leads by a one sampling window time, by the time the first "1" bit propagates to latch d15 and after sampling to the shadow registers 96, the next "1" bit will have propagated to latch d21 if it lags or to latch d02 if it leads (both shown as a double asterisks). The start control unit 100 can recognize an error of one sampling window time, and still issue a start code.

Referring back to FIG. 12A and also to FIG. 12B, which shows a timing diagram of the signals propagating in the start control unit 100, the "1" bit at one of the sixth column latches d05, d15, d25 and d35 of the phase sample registers 94 is applied to the phase-corresponding portion of the start control unit 100. For instance, in the example, the 90 degree phase (Ph1) of the time-balanced signal clocked the "1" bit in the phase sample register. Therefore, that "1" bit is applied to the portion of the start control unit 100 that corresponds to that phase.

The "1" bit propagates into the corresponding portion of the start control unit 100, and initially to the outputs of AND-gate 122, latch Seta10 and latch Seta11. The AND-gate 124 thereafter compares the "1" bit to a start decode that is applied to the other input of the gate. The start decode designates the registers of the shadow phase sample registers 96 where the next "1" bit could be in order for the start control unit 100 to issue a start. Taking the working example again and referring to the table shown in FIG. 12A, if the next "1" bit is in either registers d02', d11' or d21' of the shadow phase sample register 96, then a "1" will be applied to the input of the AND-gate 124 and when logically ANDed with the "1" bit that propagated to the input of the gate from latch d15, a "1" will be appear at the output of the AND-gate 124. This "1," after it has propagated to the output of the SetaP1 latch, is designated as the start code.

If, however, the next "1" bit is in register d22', then a "0" will be applied to the input of the AND-gate 124, and in turn, a "0" will appear at the output of the gate; thereby, not forming a start code. According to the table, if a "1" bit appears at the "Never" shadow registers (see table), then a start code will not form. The "Never" latches do not depend on which phase the first "1" bit is in; the others do. The table in FIG. 12A denotes the start decode for the portion of the start control unit the correspond to all the phases. As previously mentioned, the start decode is a "1" where the next bit arrives in phase with the previous bit or when it arrives one sampling window time earlier or later.

If the start decode is "1" and, in turn, the output of AND-gate 124 is also a "1", then that "1" will propagate to the output of latch SetaP1 and then is ORed with the other outputs of the SetaP1 latch corresponding to the other phases. The result of that ORed is then applied to a first input of AND-gates 126a–d, each of which has the data in latches d03–d33 applied to its second input. By the time the start "1" bit arrives at the input of AND-gates 126a–d, the next "1" bit would have propagated to one of latches d03–d33. This will cause one of the AND-gates 126a–d to go high depending on which of the latches d03–d33 the next "1" is. The "1" at the output of such AND-gate will propagate to the output of the select phase latches 128a–d. The outputs of the select phase latches are ORed and NOTed and fedback to each input of AND-gate 122 corresponding to all the phases. Thus, when the start "1" bit propagates to one of the select latches 128a–d, meaning that a successful start has been achieved, the select phase latches 128a–d disables the start control unit 100 by the disabling AND-gate 122.

Referring to FIG. 14, a block diagram of the phase select and shift control unit 102 is shown. One of the functions of the phase select and shift control unit is to output an initial phase of the time-balanced signal after it has received the start code from the start control unit 100. A further function of the phase select and shift control unit 102 is to shift to a new selected phase of the time-balanced signals so that synchronization of the incoming asynchronous data stream is maintained as the data rate thereof varies. In other words, it shifts the selected phase so that the synchronous clock tracks the incoming asynchronous data stream.

The phase select and shift control unit 102 comprises a phase 0 (0 degree, preferably) select circuit 130a, a phase 1 (90 degrees, preferably) select circuit 130b, a phase 2 (180 degrees, preferably) select circuit 130c and a phase 3 (270 degrees, preferably) select circuit 130d. The outputs of phase 0 and 1 select circuits 130a and 130b are coupled to the inputs of OR-gate 132. The outputs of phase 2 and 3 select circuits 130c and 130d are coupled to the inputs of OR-gate 134. The outputs of OR-gates 132 and 134 are coupled to the inputs of OR-gate 136.

The phase select circuits 130a–d, component-wise, comprises three AND-gates 138(a–d)(1–3) having outputs coupled to the inputs of OR-gates 140a–d, respectively. The output of OR-gates 140a–d are coupled to the data input of latches 142a–d, respectively; which have each a Q-output fedback to a first input of AND-gates 138(a–d)1 and also coupled to a first input of AND-gates 144a–d, respectively. Phases 0–4 of the time-balanced signals are applied to a second input of AND-gates 144a–d, respectively, for gating the phases 0 and 1 to the inputs of OR-gates 132 and phases 2 and 3 to the inputs of OR-gate 134.

The outputs of OR-gates 140a–d are coupled to the data inputs of latches 146a–d, respectively. Latches 142a–d and 146a–d are clocked by the NOT of the phase 0 time-balanced signal. The phase select circuits 130a–d further include AND-gates 148(a–d)(1–2) having outputs coupled to OR-gates 150a–d, respectively. OR-gates 150a–d have outputs coupled to a first input of AND-gates 138(a–d)2, respectively. The Q-outputs of latches 146a–d are fedback to first inputs of AND-gates 148(b,c,d,a)1, respectively. Also the Q-outputs of latches 146a–d are fedback to first inputs of AND-gates 148(d,a,b,c)2, respectively.

From a signal standpoint, a "Hold" control signal is applied to second inputs of AND-gates 138(a–d)1; a "Shift" control signal is applied to second inputs of AND-gates 138(a–d)2; and the Start signal from the ORed output of the SetaP1 latches of each phase of the start control unit 100 is applied to first inputs of AND-gates 138(a–d)3, and the data from latches d03–33 of the phase sample register 94 are applied to second inputs of AND-gates 138(a–d)3, respectively. A "Lead" control signal is applied to each second input of latches 148(a–d)1. And a "Lag" control signal is applied to each second input of AND-gates 148(a–d)2.

For the purpose of explaining the operation of the phase select and shift control unit 102, assume that no phase of the time-balanced signals has not been selected by the phase select and shift control unit. Initially, an asynchronous data stream will be clocked into the phase sample registers 94 and the start control unit 100 thereafter determines based on the content of the shadow phase sample registers 96 whether the data bits correspond to an acceptable pattern for the start control unit 100 to issue a start signal. If that is the case, the start signal being a high or "1" bit is applied to the first inputs of AND-gates 138(a–d)3. Further assume that at the time the start signal goes high, a "1" bit is present in latch d03 of the phase sample registers 94. This will cause the outputs of AND-gate 138a3 and OR-gate 140a to go high. Upon the "1" bit being clocked to the Q-output of latch 142a by the NOT of phase 0 time-balanced signal, the AND-gate 144a will be enabled; thereby, gating the Phase 0 time-balanced signal to the outputs of OR-gates 132 and 136. The output of OR-gate 136 being coupled to the tracking ring counter 106 applies phase 0 of the time-balanced signal thereto for development of a synchronous clock therefrom.

Once the start signal is issued by the start control unit 100 and the appropriate phase of the time-balanced signal is applied to the tracking ring counter 106 for developing the synchronous clock, the start control unit 100 relinquishes control of the phase select and shift control unit 102 to both the phase position decode 112 and the velocity error register 110. As discussed earlier, the phase position decode 112 and the velocity error register 110 determine how to select and switch to the selected phase of the time-balanced signal in order to track the phase of the incoming asynchronous data stream and also to estimate the phase when numerous consecutive "0"s are transmitted, respectively. When these units determine that a phase change is required, it sends the phase select and control unit 102 the appropriate control signals so that it can output the proper phase of the time-balanced.

For example, assume that the phase select and shift control unit 102 is selecting phase 0 (preferably, 0 degrees) of the time-balanced signal and the phase position decode 112 or the velocity error register 110 determines that the current selected phase need not change to keep in phase with the data stream, these units would cause the "Hold" control signal to be a high or a "1." This would cause the "1" bit to propagate around the phase 0 feedback loop consisting of AND-gate 138a1, OR-gate 140a and latch 142a. Thus, a constant "1" will appear at the first input of AND-gate 144a which will maintain the gating of phase 0 of the time-balanced signal to the output of OR-gate 136. Thereby, maintaining the selected phase.

If, on the other hand, the phase position decode 112 or the velocity error register 110 determines that a phase change is required, for example because the next bit of the asynchronous data stream is lagging or because the rate of the data stream is periodically lagging by one bit, then the "Hold" control signal is caused to go low ("0") which places a "0" at the input of AND-gate 144a and thus disables the gate; thereby preventing phase 0 of the time-balanced signal to gate to the output of OR-gate 136. Simultaneously, the "Shift" control signal is caused to go high ("1") and the "Lag" control is caused to go high ("1"). Since the current selected phase is phase 0, the PhoSel signal at the Q-output of latch 146a is high ("1"). Therefore, the inputs to AND-gate 148d2 are both high (that is, Ph0Sel=1, Lag=1), which causes that gate to output a high ("1") to the input of AND-gate 138d2. Since the "Shift" control signal is also high, both inputs to AND-gate 138d2 are high, and thus, the output of the gate also goes high ("1"). This causes a high ("1") to propagate within the feedback loop of the phase 3 select circuit 103d, and in turn, to the input of AND-gate 144d for gating Phase 3 of the time-balanced signal to the output of OR-gate 136. Upon that happening, the "Hold" signal goes high ("1") to maintain a high ("1") at the input of AND-gate 144d. Thereby, allowing phase 3 of the time-balanced signal to gate to the output of OR-gate 136, as the selected phase.

A similar process is involved if the phase position decode 112 or the velocity error register 110 determine that a "lead" phase change is required. Taking the previous example again, the "Hold" control signal is caused to go low ("0"), which causes AND-gate 144a to stop gating phase 0 of the time-balanced signal to the output of OR-gate 136. Simultaneously, the "Lead" and the "Shift" control signal also goes high ("1"); and since the Q-output of latch 146a is high (Ph0Sel=1), both inputs to AND-gate 148b1 are high ("1"). Thus, the output of AND-gate 148b1 goes high ("1"), which is then applied to AND-gate 148b2, whose output is caused to go high ("1") since the "Shift" control signal is also high ("1"). A high ("1") is placed in the feedback loop of the phase 1 select circuit 130b and the "Hold" control signal is caused to go high ("1"); thereby enabling AND-gate 144b to gate phase 1 of the time-balanced signal to propagate to the output of OR-gate 136, as the selected phase.

Referring to FIG. 14B, a timing diagram of the selected phase signal of the phase select and shift control unit is shown. Since the preferred frequency of the time-balanced signals is four times the approximate data rate of the asynchronous data stream, four cycles of the time-balanced signal will occur for each bit received of the asynchronous data stream. For allocation processing steps, this defines four time windows T0–T4 to perform them in. It is defined that the new selected phase of the time-balanced signal will occur at the beginning of time window T0. Therefore, the control signals sent to the phase select and shift control unit 102 are sent during time window T3, so that the selected phase becomes available at time window T0.

In the previous example where the current selected phase is phase 0, an instruction to the phase select and shift control unit 102 to change the selected phase from phase 0 to phase 1, will cause the Ph0Sel signal to go low ("0") and the Ph1Sel signal to go high ("1") during time window T3. By the time window T0 begins, the selected phase has changed to phase 1. Similarly, if an instruction to the phase select and shift control unit 102 to change the selected phase from phase 0 to phase 3, the Ph0Sel goes low ("0") and the Ph3Sel goes high ("1") during time window T3. By the time window T0 begins, the selected phase has changed to phase 3. Note the smooth, glitchless change of the transition. In the case of a change from phase 0 to phase 1, there is a quarter cycle longer low ("0") state during the transition from time T3 to T0. In the case of a change from phase 0 to phase 3, there is a quarter cycle shorter low ("0") state. But in both cases, the transition is continuous and without glitches.

Referring to FIG. 15, a table illustrating the phase position decodes is shown. The phase position decodes 112 is coupled to the shadow phase sample registers 96 and compares the content thereof to the selected phase each bit time of the asynchronous data. The phase position decode unit 112 then issues an appropriate instruction to the phase select and shift control unit 102 so that the appropriate phase of the time-balanced signals is selected for maintaining the synchronous clock in phase with the asynchronous data stream. If there is no phase drift between consecutive bits (that is, for phases 0–3, the next "1" bit is in registers d01', d11', d21' and d31', respectively, of the shadow phase sample register 96), then the phase position decodes does not issue a change in phase code (see table). However, if there is a lagging phase error in the next "1" bit (that is, for phases 0–3 there is a "1" bit is in registers d32', d02', d12' and d22', respectively), then the phase position decodes 112 issues a lag instruction to the phase select and shift control unit (see table). The rest of the table shows which registers of the shadow phase sample registers 96 requires the phase select decodes 112 to issue a lag2, lead1, lead2 and a tracking error instruction. A tracking error instruction causes all the phase select latches of the start control unit 100 and the phase select and shift control unit 102 to go low ("0"), thereby enabling the start control unit 100 to attempt a recovery start.

Referring to FIG. 16, a table depicting the step decode pattern of the velocity error register 110 is shown. The velocity error register 110 consists of two counters. A first counter operates at the expected data rate of the asynchronous data stream (that is, in the example provided herein, at a data rate four times less than that of the time-balanced signals). It is preferably a modulo 16 counter and circularly counts from 0 to 15.

A second counter of the velocity error register 110 counts the net shifts in the phase that occur within a specified period; in the example provided herein, it counts the relative occurrence of shifts that occur within one cycle of the modulo 16 counter. What is meant by the net shifts is that, for example, if during one cycle of the modulo 16 counter, three leading shifts and two lagging shifts occur, then the net shifts that has occurred during that period is one leading shift. The velocity error register 110 determines the net shifts preferably during the acquisition of the synchronous bits (that is, the preamble of "1"s). Then during acquisition of the asynchronous data stream, it will instruct the phase select and shift control unit 102 to shift the phase an amount equal to the net shift for each specified period, i.e. 16 bit times in the preferred embodiment.

The table in FIG. 16 shows at what bit time within the specified period the velocity error register issues a shift instruction so that the net shift is accomplished during the specified period. For instance, if the net shift is one per 16 bit times, then the velocity error register preferably issues the shift instruction to the phase select and shift control unit 102 at position 8 of the modulo 16 counter. If, for example, the net shift is two, then the velocity error register preferably issues the shift instruction to the phase select and shift control unit at positions 4 and 12 of the modulo 16 counter. The rest of the table shows the positions of the modulo 16 counter where the velocity error register issues a shift instruction for the net shifts being 4, 8 and 16. Therefore, when the asynchronous data stream consists of numerous consecutive "0"s where no pulses occur and hence no timing information is received, the velocity error register 110 issues the shift instruction as an estimate where the shift would have occurred if "1"s were transmitted. Thus, the data phase tracker 18 attempts to synchronize the asynchronous data stream during transmission of numerous consecutive "0"s.

Referring to FIGS. 17A and 17B, a block diagram of the tracking ring counter 106 is shown, along with a timing diagram of the signals propagating therein, respectively. The functions performed by the tracking ring counter 106 include synthesizing the synchronous clock from the selected phase and also to be used as a clock for clocking the content of the phase sample registers 94 to the shadow phase sample registers 96.

The tracking ring counter 106 is essentially a divide-by-four counter having four latches 150, 152, 154 and 156 connected in series; that is, the data inputs of latches 150, 152 and 154 are coupled to the data inputs of latches 152, 154 and 156, respectively. The tracking ring counter 106 further includes an AND-gate 158 having inputs for receiving the NOT of the Q-outputs of latches 152, 154 and 156, and a "+RUN" control signal for enabling the tracking ring counter 106. The output of AND-gate 158 is coupled to the data input of latch 150. The latches 152, 154, 156 and 158 each further include a clock input, where the selected phase from the phase select and shift control unit 102 is applied to.

The signals at the Q-output of latches 150, 152, 154 and 156 are at a frequency a factor of four less than the frequency of the time-balanced signals, with a 25 percent duty cycle. Each signal at the Q-output of latches 150, 152, 154 and 156 are spaced apart in phase from each other by 90 degrees; the output of latch 150 having a rising edge in-phase with the selected phase of the time-balanced signals and also represents the synchronous clock.

Since the signals at the output of latches 150, 152, 154 and 156 are spaced apart in phase from each other by 90 degrees and approximate the data rate of the incoming asynchronous data stream, the pulses of these signals define the four time periods T0, T1, T2 and T3 that was previously discussed for allocating the different functions of the data phase tracker 18 to be performed in. The time period T0 defines the rise of a new selected phase of the time-balanced signal; time period T1 is a waiting period; time period T2 calls for the sampling of the content of the phase sample registers 94 to the shadow phase sample registers 96; and time period T3 provides the time for determining the selected phase by analyzing the content of the shadow phase sample registers.

It is to be understood that while the invention has been described above in conjunction with preferred specific embodiments, the description and examples are intended to illustrate and not limit the scope of the invention, which is defined by the scope of the appended claims.

It is claimed:

1. An apparatus for generating a selected phase of a clock signal, comprising:
    a delay line comprising a plurality of delay elements and having an input for receiving said clock signal,
    a memory device for sampling therein the data outputs of said delay elements;
    a device coupled to said memory device for selecting which delay element output produces the selected phase of the clock signal;
    a first gating device coupled to the outputs of said delay elements and to the selecting device for gating the output of the delay element that produces the selected phase of the base clock signal, and
    a second gating device for gating the clock signal into the delay line.

2. An apparatus for generating a selected phase of a clock signal, comprising:
    a delay line comprising a plurality of delay elements and having an input for receiving said clock signal;
    a memory device for sampling therein the data outputs of said delay elements;
    a device coupled to said memory device for selecting which delay element output produces the selected phase of the clock signal;
    a first gating device coupled to the outputs of said delay elements and to the selecting device for gating the output of the delay element that produces the selected phase of the base clock signal; and
    a second gating device for gating the clock signal into the delay line;
    wherein the selecting device includes:
        means for controlling the second gating device for allowing one period of the clock signal to propagate into the delay line;
        means for finding the delay element that holds the last data of the period of the clock signal that propagated into the delay line; and
        means for determining which delay element outputs the selected phase of the clock based on the delay element that outputs said last data.

3. An apparatus for generating a clock signal with a selected phase relative to an input clock signal, comprising:

a delay line that receives said input clock signal and includes a plurality of delay elements having individual data outputs, a memory device connected to the delay line individual data outputs for sampling said data outputs, a device coupled to said memory device for selecting one of the delay line individual data outputs that provides the clock with signal the selected phase, a first gating device coupled to the delay element data outputs and to the selecting device for gating the selected delay element data output, thereby to gate the selected clock signal phase, and a second gating device responsive to the selecting device for gating the clock signal into the delay line.

* * * * *